US010403160B2

(12) United States Patent
Knoblach

(10) Patent No.: US 10,403,160 B2
(45) Date of Patent: Sep. 3, 2019

(54) TECHNIQUES FOR INTELLIGENT BALLOON/AIRSHIP LAUNCH AND RECOVERY WINDOW LOCATION

(71) Applicant: SPACE DATA CORPORATION, Chandler, AZ (US)

(72) Inventor: Gerald Mark Knoblach, Chandler, AZ (US)

( * ) Notice: Subject to any disclaimer, the term of this patent is extended or adjusted under 35 U.S.C. 154(b) by 0 days.

(21) Appl. No.: 14/757,426

(22) Filed: Dec. 23, 2015

(65) Prior Publication Data

US 2016/0196757 A1 Jul. 7, 2016

Related U.S. Application Data

(60) Provisional application No. 62/096,757, filed on Dec. 24, 2014.

(51) Int. Cl.
*G08G 5/04* (2006.01)
*B64B 1/40* (2006.01)
(Continued)

(52) U.S. Cl.
CPC .............. *G08G 5/04* (2013.01); *B64B 1/40* (2013.01); *G05D 1/105* (2013.01); *G08G 5/003* (2013.01);
(Continued)

(58) Field of Classification Search
CPC ........ G08G 5/04; G08G 5/003; G08G 5/0034; G08G 5/0039; G08G 5/0013;
(Continued)

(56) References Cited

U.S. PATENT DOCUMENTS 2,151,336 A 3/1939 Scharlau
2,366,423 A 1/1945 Pear, Jr.
(Continued)

FOREIGN PATENT DOCUMENTS

DE 1188951 3/1965
EP 0490722 6/1992
(Continued)

OTHER PUBLICATIONS

International Search Report and Written Opinion dated Apr. 28, 2016 in corresponding International Patent Application No. PCT/US2015/000279 (15 pages).
(Continued)

*Primary Examiner* — Richard A Goldman
(74) *Attorney, Agent, or Firm* — Raju Dave; Dave Law Group, LLC

(57) ABSTRACT

Devices, methods and systems for minimizing the probability of a collision between an aircraft and a floating platform are described. The device may include a processor in communication with a memory. The processor is configured to obtain a flight-path vector of an aircraft; determine a probability related to a plurality of flight-paths of a floating platform over a period of time based on operating parameters for the floating platform and weather data; and determine, based on the flight-path vector and the probability related to the plurality of flight-paths of the floating platform, a time and/or a location for launch or recovery of the floating platform that minimizes a probability of a collision between the aircraft and the floating platform while the floating platform is in flight.

27 Claims, 8 Drawing Sheets

(51) Int. Cl.
  *G08G 5/00* (2006.01)
  *H04B 7/185* (2006.01)
  *G05D 1/10* (2006.01)

(52) U.S. Cl.
  CPC ......... *G08G 5/0013* (2013.01); *G08G 5/0021* (2013.01); *G08G 5/0026* (2013.01); *G08G 5/0034* (2013.01); *G08G 5/0069* (2013.01); *G08G 5/045* (2013.01); *H04B 7/18502* (2013.01); *G08G 5/0078* (2013.01); *G08G 5/0082* (2013.01)

(58) Field of Classification Search
  CPC .. G08G 5/0021; G08G 5/0026; G08G 5/0069; G08G 5/0045; G08G 5/0073; G08G 5/0078; G08G 5/0082; G08G 5/0004; G08G 5/0008; G08G 5/045; G08G 5/0091; B64B 1/40; G01C 21/00; G05D 1/105; H04B 7/18502; H04B 7/18504; B64C 39/02; B64C 39/0024; B64C 2201/14; B64C 2201/141; B64C 2201/146; B64C 2201/021; B64C 2201/022
  USPC ..... 701/2, 3, 4, 300, 301, 302, 26; 340/961; 342/29, 30
  See application file for complete search history.

(56) References Cited

U.S. PATENT DOCUMENTS

| | | |
|---|---|---|
| 2,462,102 A | 2/1949 | Istvan |
| 2,542,823 A | 2/1951 | Lyle |
| 2,598,064 A | 5/1952 | Lindenblad |
| 2,626,348 A | 1/1953 | Nobles |
| 2,742,246 A | 4/1956 | Mellen |
| 3,030,500 A | 4/1962 | Katzin |
| 3,030,509 A | 4/1962 | Carlson |
| 3,045,952 A | 7/1962 | Underwood |
| 3,058,694 A | 10/1962 | Fazio et al. |
| 3,174,705 A | 3/1965 | Schiff et al. |
| 3,206,749 A | 9/1965 | Chatelain |
| 3,384,891 A | 5/1968 | Anderson |
| 3,404,278 A | 10/1968 | Chope |
| 3,471,856 A | 10/1969 | Laughlin, Jr. et al. |
| 3,555,552 A | 1/1971 | Alford |
| 3,674,225 A | 7/1972 | Johnson |
| 3,742,358 A | 6/1973 | Cesaro |
| 3,781,893 A | 12/1973 | Beukers et al. |
| 3,781,894 A | 12/1973 | Ancona et al. |
| RE28,725 E | 2/1976 | Hutchinson et al. |
| 4,123,987 A | 11/1978 | Singerle et al. |
| 4,249,181 A | 2/1981 | Lee |
| 4,262,864 A | 4/1981 | Eshoo |
| 4,394,780 A | 7/1983 | Mooradian |
| 4,419,766 A | 12/1983 | Goeken et al. |
| 4,457,477 A | 7/1984 | Regipa |
| 4,472,720 A | 9/1984 | Reesor |
| 4,481,514 A | 11/1984 | Beukers et al. |
| 4,509,053 A | 4/1985 | Robin et al. |
| 4,509,851 A | 4/1985 | Ippolito et al. |
| 4,589,093 A | 5/1986 | Ippolito et al. |
| 4,595,928 A | 6/1986 | Wingard |
| 4,689,739 A | 8/1987 | Federico et al. |
| 4,696,052 A | 9/1987 | Breeden |
| 4,740,783 A | 4/1988 | Lawrence et al. |
| 4,747,160 A | 5/1988 | Bossard |
| 4,868,577 A | 9/1989 | Wingard |
| 4,979,170 A | 12/1990 | Gilhousen et al. |
| 4,995,572 A | 2/1991 | Piasecki |
| 5,005,513 A | 4/1991 | Van Patten et al. |
| 5,067,172 A | 11/1991 | Schloemer |
| 5,119,397 A | 6/1992 | Dahlin et al. |
| 5,121,128 A | 6/1992 | Lidth de Jeude et al. |
| 5,123,112 A | 6/1992 | Choate |
| 5,175,556 A | 12/1992 | Berkowitz |
| 5,189,734 A | 2/1993 | Bailey et al. |
| 5,204,970 A | 4/1993 | Stengel et al. |
| 5,212,804 A | 5/1993 | Choate |
| 5,214,789 A | 5/1993 | George |
| 5,218,366 A | 6/1993 | Cardamone et al. |
| 5,235,633 A | 8/1993 | Dennison et al. |
| 5,239,668 A | 8/1993 | Davis |
| 5,287,541 A | 2/1994 | Davis |
| 5,327,572 A | 7/1994 | Freeburg |
| 5,345,448 A | 9/1994 | Keskitalo |
| 5,359,574 A | 10/1994 | Nadolink |
| 5,384,565 A | 1/1995 | Cannon |
| 5,420,592 A | 5/1995 | Johnson |
| 5,430,656 A | 7/1995 | Dekel et al. |
| 5,433,726 A | 7/1995 | Horstein et al. |
| 5,439,190 A | 8/1995 | Horstein et al. |
| 5,444,762 A | 8/1995 | Frey et al. |
| 5,455,823 A | 10/1995 | Noreen et al. |
| 5,467,681 A | 11/1995 | Liberman |
| 5,471,641 A | 11/1995 | Dosiere et al. |
| 5,488,648 A | 1/1996 | Womble |
| 5,519,761 A | 5/1996 | Gilhousen |
| 5,521,817 A | 5/1996 | Burdoin et al. |
| 5,533,029 A | 7/1996 | Gardner |
| 5,557,656 A | 9/1996 | Ray et al. |
| 5,559,865 A | 9/1996 | Gilhousen |
| 5,584,047 A | 12/1996 | Tuck |
| 5,615,409 A | 3/1997 | Forssen et al. |
| 5,645,248 A | 7/1997 | Campbell |
| 5,714,948 A | 2/1998 | Farmakis et al. |
| 5,745,685 A | 4/1998 | Kirchner et al. |
| 5,748,620 A | 5/1998 | Capurka |
| 5,759,712 A | 6/1998 | Hockaday |
| 5,761,656 A | 6/1998 | Ben-Shachar |
| 5,781,739 A | 7/1998 | Bach et al. |
| 5,788,187 A | 8/1998 | Castiel et al. |
| 5,832,380 A | 11/1998 | Ray et al. |
| 5,835,059 A | 11/1998 | Nadel et al. |
| 5,870,549 A | 2/1999 | Bobo |
| 5,899,975 A | 5/1999 | Nielsen |
| 5,907,949 A | 6/1999 | Falke et al. |
| 5,909,299 A | 6/1999 | Sheldon, Jr. et al. |
| 5,960,200 A | 9/1999 | Eager et al. |
| 5,963,128 A | 10/1999 | McClelland |
| 5,978,940 A | 11/1999 | Newman et al. |
| 5,987,432 A | 11/1999 | Zusman et al. |
| 5,992,795 A | 11/1999 | Tockert |
| 5,996,001 A | 11/1999 | Quarles et al. |
| 6,061,562 A | 5/2000 | Martin et al. |
| 6,067,579 A | 5/2000 | Hardman et al. |
| 6,097,688 A | 8/2000 | Ichimura et al. |
| 6,108,673 A | 8/2000 | Brandt et al. |
| 6,128,622 A | 10/2000 | Bach et al. |
| 6,141,660 A | 10/2000 | Bach et al. |
| 6,167,263 A | 12/2000 | Campbell |
| 6,212,550 B1 | 4/2001 | Segur |
| 6,243,737 B1 | 6/2001 | Flanagan et al. |
| 6,250,309 B1 | 6/2001 | Krichen et al. |
| 6,253,200 B1 | 6/2001 | Smedley et al. |
| 6,256,676 B1 | 7/2001 | Taylor et al. |
| 6,259,447 B1 | 7/2001 | Kanetake et al. |
| 6,289,382 B1 | 9/2001 | Bowman-Amuah |
| 6,324,398 B1 | 11/2001 | Lanzerotti et al. |
| 6,397,253 B1 | 5/2002 | Quinlan et al. |
| 6,401,136 B1 | 6/2002 | Britton et al. |
| 6,414,947 B1 | 7/2002 | Legg et al. |
| 6,446,110 B1 | 9/2002 | Lection et al. |
| 6,507,856 B1 | 1/2003 | Chen et al. |
| 6,507,857 B1 | 1/2003 | Yalcinalp |
| 6,510,466 B1 | 1/2003 | Cox et al. |
| 6,519,617 B1 | 2/2003 | Wanderski et al. |
| 6,529,921 B1 | 3/2003 | Berkowitz et al. |
| 6,530,078 B1 | 3/2003 | Shmid et al. |
| 6,535,896 B2 | 3/2003 | Britton et al. |
| 6,543,343 B2 | 4/2003 | Taylor |
| 6,560,639 B1 | 5/2003 | Dan et al. |
| 6,568,631 B1 | 5/2003 | Hillsdon |

(56) References Cited

U.S. PATENT DOCUMENTS

| | | |
|---|---|---|
| 6,589,291 B1 | 7/2003 | Boag et al. |
| 6,591,272 B1 | 7/2003 | Williams |
| 6,601,071 B1 | 7/2003 | Bowker et al. |
| 6,606,642 B2 | 8/2003 | Ambler et al. |
| 6,613,098 B1 | 9/2003 | Sorge et al. |
| 6,615,383 B1 | 9/2003 | Talluri et al. |
| 6,628,941 B2 | 9/2003 | Knoblach et al. |
| 6,643,825 B1 | 11/2003 | Li et al. |
| 6,665,861 B1 | 12/2003 | Francis et al. |
| 6,666,410 B2 * | 12/2003 | Boelitz ............... B64G 1/002 244/171.1 |
| 6,668,354 B1 | 12/2003 | Chen et al. |
| 6,675,095 B1 * | 1/2004 | Bird .................. G05D 1/0061 340/436 |
| 6,687,873 B1 | 2/2004 | Ballantyne et al. |
| 6,697,489 B1 | 2/2004 | Carlson |
| 6,728,685 B1 | 4/2004 | Ahluwalia |
| 6,738,975 B1 | 5/2004 | Yee et al. |
| 6,753,889 B1 | 6/2004 | Najmi |
| 6,772,206 B1 | 8/2004 | Lowry et al. |
| 6,775,680 B2 | 8/2004 | Ehrman et al. |
| 6,799,299 B1 | 9/2004 | Li et al. |
| 6,810,429 B1 | 10/2004 | Walsh et al. |
| 6,816,883 B2 | 11/2004 | Baumeister et al. |
| 6,826,696 B1 | 11/2004 | Chawla et al. |
| 6,843,448 B2 | 1/2005 | Parmley |
| 6,850,979 B1 | 2/2005 | Saulpaugh et al. |
| 6,859,834 B1 | 2/2005 | Arora et al. |
| 6,874,146 B1 | 3/2005 | Lyengar |
| 6,889,360 B1 | 5/2005 | Ho et al. |
| 6,901,403 B1 | 5/2005 | Bata et al. |
| 6,901,430 B1 | 5/2005 | Smith |
| 6,904,598 B2 | 6/2005 | Abileah et al. |
| 6,907,564 B1 | 6/2005 | Burchhardt et al. |
| 6,909,903 B2 | 6/2005 | Wang |
| 6,910,216 B2 | 6/2005 | Abileah et al. |
| 6,912,719 B2 | 6/2005 | Elderon et al. |
| 6,915,523 B2 | 7/2005 | Dong et al. |
| 6,948,117 B2 | 9/2005 | Van Eaton et al. |
| 6,948,174 B2 | 9/2005 | Chiang et al. |
| 6,952,717 B1 | 10/2005 | Monchilovich et al. |
| 6,964,053 B2 | 11/2005 | Ho et al. |
| 6,971,096 B1 | 11/2005 | Ankiredipally et al. |
| 6,980,963 B1 | 12/2005 | Hanzek |
| 6,980,993 B2 | 12/2005 | Horvitz et al. |
| 7,000,238 B2 | 2/2006 | Nadler et al. |
| 7,013,306 B1 | 3/2006 | Turba et al. |
| 7,043,687 B2 | 5/2006 | Knauss et al. |
| 7,051,032 B2 | 5/2006 | Chu-Carroll et al. |
| 7,054,901 B2 | 5/2006 | Shafer |
| 7,058,955 B2 | 6/2006 | Porkka |
| 7,069,291 B2 | 6/2006 | Graves et al. |
| 7,080,092 B2 | 7/2006 | Upton |
| 7,093,789 B2 | 8/2006 | Barocela et al. |
| 7,107,285 B2 | 9/2006 | von Kaenel et al. |
| 7,111,011 B2 | 9/2006 | Kobayashi et al. |
| 7,120,645 B2 | 10/2006 | Manikutty et al. |
| 7,120,702 B2 | 10/2006 | Huang et al. |
| 7,124,299 B2 | 10/2006 | Dick et al. |
| 7,130,893 B2 | 10/2006 | Chiang et al. |
| 7,134,075 B2 | 11/2006 | Hind et al. |
| 7,143,190 B2 | 11/2006 | Christensen et al. |
| 7,152,205 B2 | 12/2006 | Day et al. |
| 7,181,493 B2 | 2/2007 | English et al. |
| 7,266,582 B2 | 9/2007 | Stelting |
| 7,296,229 B2 | 11/2007 | Junkermann |
| 7,341,223 B2 | 3/2008 | Chu |
| 7,398,221 B1 | 7/2008 | Bensoussan et al. |
| 7,418,508 B2 | 8/2008 | Haller et al. |
| 7,421,701 B2 | 9/2008 | Dinh et al. |
| 7,487,936 B2 | 2/2009 | Heaven |
| 7,567,779 B2 | 7/2009 | Seligsohn et al. |
| 7,590,987 B2 | 9/2009 | Behrendt et al. |
| 7,801,522 B2 | 9/2010 | Knoblach et al. |
| 8,286,910 B2 | 10/2012 | Alavi |
| 8,342,442 B1 | 1/2013 | Dancila |
| 8,718,477 B2 | 5/2014 | Devaul et al. |
| 8,733,697 B2 | 5/2014 | Devaul et al. |
| 8,812,176 B1 | 8/2014 | Biffle et al. |
| 8,820,678 B2 | 9/2014 | Devaul et al. |
| 8,996,024 B1 | 3/2015 | Teller et al. |
| 9,300,388 B1 | 3/2016 | Behroozi et al. |
| 9,407,362 B2 | 8/2016 | Devaul et al. |
| 9,424,752 B1 | 8/2016 | Bonawitz |
| 9,590,721 B2 | 3/2017 | Behroozi et al. |
| 9,714,831 B2 | 7/2017 | Kapoor et al. |
| 2001/0004583 A1 | 6/2001 | Uchida |
| 2001/0014900 A1 | 8/2001 | Brauer et al. |
| 2001/0016869 A1 | 8/2001 | Baumeister et al. |
| 2001/0032232 A1 | 10/2001 | Zombek et al. |
| 2001/0034791 A1 | 10/2001 | Clubb et al. |
| 2001/0037358 A1 | 11/2001 | Clubb et al. |
| 2001/0047311 A1 | 11/2001 | Singh |
| 2002/0010716 A1 | 1/2002 | McCartney et al. |
| 2002/0031101 A1 | 3/2002 | Petite et al. |
| 2002/0035583 A1 | 3/2002 | Price et al. |
| 2002/0038335 A1 | 3/2002 | Dong et al. |
| 2002/0038336 A1 | 3/2002 | Abileah et al. |
| 2002/0042849 A1 | 4/2002 | Ho et al. |
| 2002/0046294 A1 | 4/2002 | Brodsky et al. |
| 2002/0049815 A1 | 4/2002 | Dattatri |
| 2002/0052968 A1 | 5/2002 | Bonefas et al. |
| 2002/0056012 A1 | 5/2002 | Abileah et al. |
| 2002/0059344 A1 | 5/2002 | Britton et al. |
| 2002/0072361 A1 | 6/2002 | Knoblach et al. |
| 2002/0078010 A1 | 6/2002 | Ehrman et al. |
| 2002/0078255 A1 | 6/2002 | Narayan |
| 2002/0083099 A1 | 6/2002 | Knauss et al. |
| 2002/0099735 A1 | 7/2002 | Schroeder et al. |
| 2002/0100027 A1 | 7/2002 | Binding et al. |
| 2002/0107915 A1 | 8/2002 | Ally et al. |
| 2002/0111989 A1 | 8/2002 | Ambler et al. |
| 2002/0116454 A1 | 8/2002 | Dyla et al. |
| 2002/0133569 A1 | 9/2002 | Huang et al. |
| 2002/0143820 A1 | 10/2002 | Van Eaton et al. |
| 2002/0156930 A1 | 10/2002 | Velasquez |
| 2002/0160745 A1 | 10/2002 | Wang |
| 2002/0160805 A1 | 10/2002 | Laitinen et al. |
| 2002/0161801 A1 | 10/2002 | Hind et al. |
| 2002/0174340 A1 | 11/2002 | Dick et al. |
| 2002/0175243 A1 | 11/2002 | Black et al. |
| 2002/0178031 A1 | 11/2002 | Sorensen et al. |
| 2002/0178290 A1 | 11/2002 | Coulthard et al. |
| 2002/0178299 A1 | 11/2002 | Teubner |
| 2002/0188688 A1 | 12/2002 | Bice et al. |
| 2002/0194227 A1 | 12/2002 | Day et al. |
| 2002/0198974 A1 | 12/2002 | Shafer |
| 2003/0004746 A1 | 1/2003 | Kheirolomoom et al. |
| 2003/0007397 A1 | 1/2003 | Kobayashi et al. |
| 2003/0040273 A1 | 2/2003 | Seligsohn et al. |
| 2003/0040955 A1 | 2/2003 | Anaya et al. |
| 2003/0120730 A1 | 2/2003 | Kuno et al. |
| 2003/0046035 A1 | 3/2003 | Anaya et al. |
| 2003/0055768 A1 | 3/2003 | Anaya et al. |
| 2003/0065623 A1 | 4/2003 | Cornell et al. |
| 2003/0070006 A1 | 4/2003 | Nadler et al. |
| 2003/0074217 A1 | 4/2003 | Beisiegel et al. |
| 2003/0078902 A1 | 4/2003 | Leong et al. |
| 2003/0081002 A1 | 5/2003 | De Vorchik et al. |
| 2003/0093403 A1 | 5/2003 | Upton |
| 2003/0093436 A1 | 5/2003 | Brown et al. |
| 2003/0093468 A1 | 5/2003 | Gordon et al. |
| 2003/0093500 A1 | 5/2003 | Khodabakchian et al. |
| 2003/0097327 A1 | 5/2003 | Anaya et al. |
| 2003/0109281 A1 * | 6/2003 | Knoblach ............... B64B 1/40 455/556.1 |
| 2003/0121142 A1 | 7/2003 | Horvitz et al. |
| 2003/0126229 A1 | 7/2003 | Kantor et al. |
| 2003/0159111 A1 | 8/2003 | Fry |
| 2003/0163544 A1 | 8/2003 | Wookey et al. |
| 2003/0163585 A1 | 8/2003 | Elderon et al. |
| 2003/0167233 A1 | 9/2003 | Pledereder et al. |
| 2003/0191970 A1 | 10/2003 | Devine et al. |
| 2003/0204460 A1 | 10/2003 | Robinson et al. |

(56) References Cited

U.S. PATENT DOCUMENTS

| | | |
|---|---|---|
| 2003/0212686 A1 | 11/2003 | Chu-Carroll et al. |
| 2004/0006739 A1 | 1/2004 | Mulligan |
| 2004/0024820 A1 | 2/2004 | Ozzie et al. |
| 2004/0030740 A1 | 2/2004 | Stelting |
| 2004/0054969 A1 | 3/2004 | Chiang et al. |
| 2004/0064466 A1 | 4/2004 | Manikutty et al. |
| 2004/0103370 A1 | 5/2004 | Chiang et al. |
| 2004/0104304 A1 | 6/2004 | Parmley |
| 2004/0111464 A1 | 6/2004 | Ho et al. |
| 2004/0205536 A1 | 10/2004 | Newman et al. |
| 2004/0205731 A1 | 10/2004 | Junkermann |
| 2004/0205770 A1 | 10/2004 | Zhang et al. |
| 2004/0210469 A1 | 10/2004 | Jones et al. |
| 2004/0221292 A1 | 11/2004 | Chiang et al. |
| 2004/0230987 A1 | 11/2004 | Snover et al. |
| 2004/0237034 A1 | 11/2004 | Chiang et al. |
| 2005/0050228 A1 | 3/2005 | Perham et al. |
| 2005/0091639 A1 | 4/2005 | Patel |
| 2005/0165826 A1 | 7/2005 | Ho et al. |
| 2005/0165936 A1 | 7/2005 | Haller et al. |
| 2005/0166209 A1 | 7/2005 | Merrick et al. |
| 2005/0171970 A1 | 8/2005 | Ozzie et al. |
| 2005/0203944 A1 | 9/2005 | Dinh et al. |
| 2005/0210414 A1 | 9/2005 | Angiulo et al. |
| 2005/0258306 A1 | 11/2005 | Barocela et al. |
| 2005/0278410 A1 | 12/2005 | Espino |
| 2006/0063529 A1 | 3/2006 | Seligsohn et al. |
| 2006/0265478 A1 | 11/2006 | Chiang et al. |
| 2007/0083524 A1 | 4/2007 | Fung et al. |
| 2007/0084283 A1 | 4/2007 | Fung et al. |
| 2008/0263641 A1 | 10/2008 | Dinh et al. |
| 2008/0271049 A1 | 10/2008 | Dinh et al. |
| 2008/0299990 A1 | 12/2008 | Knoblach et al. |
| 2009/0189015 A1 | 7/2009 | Alavi |
| 2009/0294582 A1 | 12/2009 | Michel et al. |
| 2010/0100269 A1* | 4/2010 | Ekhaguere ............. G05D 1/101 701/26 |
| 2010/0131121 A1* | 5/2010 | Gerlock ............... G08G 5/0013 701/2 |
| 2010/0228468 A1* | 9/2010 | D'Angelo ............. G08G 5/0008 701/120 |
| 2010/0292871 A1 | 11/2010 | Schultz et al. |
| 2011/0118907 A1* | 5/2011 | Elkins ...................... B64B 1/00 701/3 |
| 2012/0158280 A1* | 6/2012 | Ravenscroft ......... G01C 21/005 701/400 |
| 2012/0223181 A1* | 9/2012 | Ciampa ..................... B64B 1/62 244/30 |
| 2013/0158749 A1* | 6/2013 | Contorer ................... G01P 5/18 701/3 |
| 2013/0175387 A1 | 7/2013 | Devaul et al. |
| 2013/0175391 A1 | 7/2013 | Devaul et al. |
| 2013/0177321 A1 | 7/2013 | Devaul et al. |
| 2014/0158823 A1* | 6/2014 | Smith ....................... B64B 1/44 244/1 A |
| 2014/0166817 A1* | 6/2014 | Levien .................. B64C 39/024 244/190 |
| 2014/0249693 A1 | 9/2014 | Stark et al. |
| 2014/0284422 A1 | 9/2014 | Sapir |
| 2014/0367511 A1 | 12/2014 | Knoblach et al. |
| 2014/0379173 A1* | 12/2014 | Knapp .................. G06Q 10/10 701/2 |
| 2015/0134150 A1* | 5/2015 | Farjon .................. G05D 1/0202 701/3 |
| 2015/0160658 A1* | 6/2015 | Reedman ............... G05D 1/102 701/3 |
| 2015/0248711 A1 | 9/2015 | Fournier et al. |
| 2016/0003620 A1* | 1/2016 | Kapoor .................. G01C 21/00 701/400 |
| 2016/0155338 A1* | 6/2016 | Lynar .................. G08G 5/0008 701/4 |
| 2016/0167761 A1 | 6/2016 | Roach |
| 2016/0189548 A1* | 6/2016 | Thurling .............. G08G 5/0013 701/3 |
| 2016/0196750 A1* | 7/2016 | Collins ................. B64C 39/024 701/14 |
| 2016/0196757 A1* | 7/2016 | Knoblach .............. G05D 1/105 701/301 |
| 2016/0226573 A1 | 8/2016 | Behroozi |
| 2016/0253908 A1* | 9/2016 | Chambers ............. B64C 39/024 701/2 |

FOREIGN PATENT DOCUMENTS

| | | |
|---|---|---|
| EP | 0837567 A2 | 4/1998 |
| EP | 1058409 | 12/2000 |
| EP | 2719719 | 4/2014 |
| GB | 2216319 | 10/1989 |
| GB | 2511447 | 9/2014 |
| JP | H0443194 | 2/1992 |
| JP | 950826 | 2/1997 |
| JP | 2001273177 | 10/2001 |
| WO | WO9504407 | 2/1995 |
| WO | WO9602094 | 1/1996 |
| WO | WO9851568 A1 | 11/1998 |
| WO | WO0101710 | 1/2001 |
| WO | WO 01/58098 | 8/2001 |
| WO | WO0167290 | 9/2001 |
| WO | 2006/108311 | 10/2006 |
| WO | 2011/148373 | 12/2011 |

OTHER PUBLICATIONS

Non-Final Office Action dated Feb. 14, 2017 in corresponding U.S. Appl. No. 15/351,441.
Notice of Allowance dated Apr. 13, 2017 in corresponding U.S. Appl. No. 15/434,036.
Notice of Allowance dated Feb. 17, 2017 in corresponding U.S. Appl. No. 15/351,438.
Final Office Action dated Aug. 1, 2017 in related U.S. Appl. No. 15/343,190.
Non-Final Office Action dated Aug. 15, 2017 in related U.S. Appl. No. 14/983,119.
"Attunity Connect for Mainframe, Native OS/390 Adapters to Data and Legacy," 2003, pp. 1-3.
"Connecting to IMS Using XML, SOAP and Web Services", Shyh-Mei F. Ho. IMS Technical Conference, Koenigswinter, Germany, Oct. 15-17, 2002.
"Correlate IMSADF Secondary Transaction MFS Generation with the Generation of the Output Format Rule", IBM Technical Disclosure Bulletin, vol. 27, No. 1B, pp. 623-624, Jun. 1984.
"Creating WSDL and a Proxy Client From A Web Service," www.west-wind.com/webconnection/docs/_08413NI2E.htm, 2002.
"HostBridge and WebSpherer: Integrating CICS with IBM's Application Server," a HostBridge White Paper, Jul. 23, 2002, pp. 1-34.
"IBM Mainframe," www.dmreview.com/whitepaper/WID1002720. pdf. Mar. 18, 2005.
"IMS Connect Guide and Reference version 1," http://publibfp. boulder.ibm.com/epubs/pdf/lcgr0001.pdf, Oct. 2000, IBM.
"IMS Connect Guide and Reference", IBM et al. http://publibfp. boulder.ibm.com/epubs/pdf/hwsuga11.pdf, Oct. 2002.
"IMS Connector for Java, User's Guide and Reference", IBM VisualAge for Java, Version 3.5, 9 pages, IBM.
"IMS Follow-on Ideal for e-business", Excerpts from http://www. 3.ibm.com/software/data/ims/...ntations/two/imsv7enh/HTML/ indexp54.htm, IBM Corporation, 2002.
"IMS Information", Excerpts from http://www.3.ibm.com/software/ data/ims/...ntations/two/imsv7enh/HTML/indexp55.htm, IBM Corporation 2002.
"Learning Management Systems XML and Web Services," Finn Gronbaek, IBM Corporation, copyright 2001, Apr. 20, 2003, pp. 1-29.
"Leveraging IMS Applications and Data"<Excerpts from Leveraging IMS2 found at http://www.3.ibm.com/software/data/ims/... ntations/two/imsv7enh/HTML/indexp52.htm, IBM Corporation, 2002.
"MFS XML Utility Version 9.8.0 User's Guide and Reference", 57 pages, IBM Corporation, ftp://ftp.software.ibm.com/software/data/ ims/toolkit/mfswebsupport/mfsxml-v3.pdf, 2003.

(56) References Cited

OTHER PUBLICATIONS

"NetDynamics, PAC for IMS" User Guide, Precise Connectivity Systems, 1998.
"Quarterdeck Mosiac User Guide," 1995, Chapters 1-7.
"Remote Execution of IMS Transactions for OS/2", IBM Technical Disclosure Bulletin, vol. 34, No. 7B, pp. 16, Dec. 1991.
"Requirements for Building Industrial Strength Web Services: The Service Broker", http:www.theserverside.com/Warticles.tss?1=Service-Broker Jul. 2001.
"S1215, WWW.IMS or Websphere Working with IMS," Ken Blackman, 39 pp. (date unknown).
"Web Services Description Language (WSDL) 1." Mar. 2001, W3C.
"Web Services", www.webopedia.com/TERM/W/Web services.html, 2003.
"Web Services—The Next Step in the Evolution of the Web", Excerpt from http://www.3.ibm.com/software/data/ims/...ntations/two/imsv7enh/HTML/indexp51.htm, IBM Corporation, 2002.
"What Web Services Are NOT", www.webreference.com/xml/column50, 2003.
"What's Next in IMS Providing Integrated e-business Solutions: IMS Version 8," Excerpt from http://www.3.ibm.com/software/data/ims/...ntations/two/imsv7enh/HTML/indexp53.htm, IBM Corporation, 2002.
"XML and IMS for Transparent Application Integration", Excerpt from http://www.3.ibm.com/software/data/ims/...ntations/two/imsv7enh/HTML/Indexp50.htm, IBM Corporation, 2002.
"XML Schema Part 2: Datatypes" 2001, W3C <http://www.w3.org/TR/2001/PR-xmischema-2-20010330>.
Application Development/Enablement, http://www.306.ibm.com/software/data/ims/presentation/five/trends2003/HTML/indexp15.htm, Oct. 11, 2003.
Arndt et al., An XML-Based Approach to Multimedia Software Engineering for Distance Learning, ACM 2002, pp. 526-532.
Blackman, "IMS eBusiness Update", IMS V8 Roadshow, 11 pages, IBM Corporation, http://www-306ibm.com.software/data/ims/shelf/presentation/oneday/IMSeBusinessUpdate2003.pdf, 2003.
Component of the Week: XMI Toolkit:, Jun. 1, 2001 http://www-106.ibm.com/developerworks/library/co-cow21.htm l.
Cover et al., "Web Services User Interface (WSUI) Initiative", http://xml.coverpages.org/wsui.html, Oct. 29, 2002.
Cover, Robin et al. Web Services for Interactive Applications (WSIA). [Web Services Component Model (WSCM)], http://xml.coverpages.org/wscm, Jan. 21, 2002, printed Oct. 31, 2007, 4 pages.
Cronje, "Absa Uses VGR to Ensure Online Availability", www-306.ibm.com/software/data/ims/quarterly/WInter2000/winter.htm.
Crouch et al., "Balloon and Airship" Compton's Interactive Encyclopedia, 5 pages excerpt, 1993-1994.
David A. Brown "Balloon Technology Offers High-Altitude Applications" Aviation Week & Space Technology, Nov. 16, 1992, pp. 56-57.
Diaz et al., Inter-Organizational Document Exchange—Facing the Conversion Problem with XML, ACM 2002, pp. 1043-104.
Djuknic, G. M. et al, (1997) "Establishing Wireless Communications Services via High-Altitude Aeronautical Platforms: A Concept Whose Time Has Come?," IEEE Communictions Magazine 35(9): 128-135.
Dymetman at al., XML and Multilingual Document Authoring: Convergent Trends, ACM Jul. 2000, pp. 243-249.
Extended European Search Report dated Aug. 1, 2006, for patent appliction No. 0502604035, 7 pages.
Extensible Markup Language (XML) 1.0 (Second Edition) Oct. 2000, W3C.
Gavan, J. (1996) "Stratospheric Quasi-Stationary Platforms: (SQ-SP) Complementary toRadio Satellite Systems," Electrical and Electronics Engineers in Israel, 1996, Nineteenth Convention of 283-286.

Glushko et al., An XML Framework for Agent-Based E-Commerce, ACM Mar. 1999, pp. 106-114.
Google Search for IMS OnDemand SOA IMS MFS Web Solution [retrieved Dec. 17, 2009 at http://www.google.com/search?hl=en$source=hp&q=MFS+MID+MOD+DIF+DOF&aq...].
Hese, Y. et al. (1998) "A Novel Broadband All Wireless Access Network Using Stratospheric Platforms " VTC 1191-1194.
Hofstetter, The Future's Future: Implications of Emerging Technology for Special Education Program Planning, Journal of Special Education Technology, Fall 2001; vol. 16, p. 7, 7 pgs.
Huang et al., Design and Implementation of a Web-based HL7 Message Generation and Validation System, Google 2003, pp. 49-58.
James Martin, "Principles of Object-Oriented Analysis and Design," Oct. 29, 1992, Chapters 1-22.
Jantti, Jouko et al., "Solutions for IMS Connectivity", http://www-1.ibm.com/support/docsview.wss?uid=swg27009024&aid=1, Feb. 2006.
Jouko Jantti et al., "IMS Version 9 Implementation Guide", ibm.com/redbooks, pp. 139-143.
Long et al. "IMS Primer" Jan. 2000, IBM, Chapter 18.
Microfocus International "DBD, PSB and MFS Statements," 2001, available at<http://supportline.microfocus.com/documentation/books/mx25sp1/imdbds.htm> as of Jun. 16, 2009.
Microsoft Corp. Computer Dictionary, Third Edition, Microsoft Press, 1997, p. 371.
Mraz, Stephen J. (1998) "Nanosatellites Head for the Launch Pad" Machine Design 70(13):38, 42, 44, 46.
Office Action from U.S. Patent and Trademark Office for U.S. Appl. No. 12/168,451, dated May 10, 2011.
Office Action from U.S. Patent and Trademark Office for U.S. Appl. No. 12/169,486, received Feb. 1, 2012.
OMG XML Metadata Interchange (XMI) Specification, Jun. 2000, OMG, v1.0.
Parr et al., Distributed Processing Involving Personal Computers and Mainframe Hosts, IEEE 1985, pp. 479-489.
PR Newswire, Sterling Commerce Announces Availability of First Data Transformation Engine to Support Both XML and Traditional EDI Standards, ProQuest May 12, 1999, pp. 1-3.
PR Newswire, XMLSolutions Delivers XML-based Prototype for Envera Marketplace, ProQuest, Apr. 2000, pp. 1-3.
Royappa, Implementing Catalog Clearinghouses with XML and XSL, ACM 1998, pp. 616-623.
Starkey, "XML-Based Templates for Generating Artifacts from Java-Based Models," Research Disclosure, Dec. 1998, pp. 1678-1680.
Stieren, SST: Using Single-sourcing, SGML, and Teamwork for Documentation, ACM 1999, pp. 45-52.
Suzuki et al., Managing the Software Design Documents with XML, ACM 1999, pp. 127-136.
UMLTM for EAI. UMLTM Profile and Interchange Models for Enterprise Application Integration (EAI). OMG document No. ad/2001-09-17.
Wong, Web services and Enterprise Application Integration, Google Jun. 2002, pp. 1-57.
International Preliminary Report on Patentability and then Written Opinion of the International Searching Authority as issued in International Patent Application No. PCT/US2015/000278, dated Jul. 6, 2017.
International Preliminary Report on Patentability and then Written Opinion of the International Searching Authority as issued in International Patent Application No. PCT/US2015/068081, dated Jul. 13, 2017.
Canadian Office Action dated Jun. 29, 2017 in corresponding Canadian Patent Application No. 2885578.

* cited by examiner

TECHNIQUES FOR INTELLIGENT BALLOON/AIRSHIP LAUNCH AND RECOVERY WINDOW LOCATION

CROSS-REFERENCE TO RELATED APPLICATIONS

This application claims benefit under 35 U.S.C. § 119(e) from U.S. Provisional Application No. 62/096,757, filed Dec. 24, 2014, which is incorporated herein by reference in its entirety.

TECHNICAL FIELD

This application is directed to unmanned lighter-than-air platforms (e.g., a ballooncraft) operating in the atmosphere, and more particularly, to avoidance of collision with aircrafts.

BACKGROUND

Lighter-than-air (LTA) platforms and devices have traditionally been used for gathering weather data the in upper atmosphere and generally, have been designed for short duration flights to provide a snapshot of weather data over the flight duration. In general, the LTA platform includes an unmanned ballooncraft that carries a LTA gas enclosure (balloon) and a payload. The payload, typically, provides the data gathering and processing capabilities. The durations of flights for LTA platforms including ascents and descents have been limited by technology and designs for the LTA gas enclosures which need to sustain low pressures in the upper atmosphere. As the technology and designs for LTA gas enclosures have improved, the flight durations have increased significantly. Rates of ascent and/or descent of these LTA platforms can be controlled and so also their altitude. Thus, it is possible to keep an LTA platform at a particular height in the upper atmosphere over long periods of time—days and even months.

These capabilities for flying and maintaining the flights of LTA platforms has led to other uses for such platforms including providing surveillance and/or communications services using one or more of such LTA platforms held in sustained flights at a desired altitude. With sustained flights for LTA platforms, however, come possibilities of collisions with powered aircrafts that may carry passengers. Such collisions can be hazardous and may result, in extreme cases, loss of life and valuable property. It is therefore, important to provide systems and methods that can minimize the possibility of hazardous collision between an LTA platform and a powered aircraft in shared airspace.

SUMMARY

Among other things, this disclosure provides embodiments of systems and methods for intelligent determination of the launch and recovery window for a floating platform.

In various embodiments, systems, devices and methods of decreasing the likelihood of a collision between a floating platform such as an unmanned ballooncraft and most powered aircraft are disclosed. In one embodiment, a device may include a a processor in communication with a memory, the processor configured to obtain a flight-path vector of an aircraft; determine a probability related to a plurality of flight-paths of a floating platform over a period of time based on operating parameters for the floating platform and weather data; and determine, based on the flight-path vector and the probability related to the plurality of flight-paths of the floating platform, a time and/or a location for launch or recovery of the floating platform that minimizes a probability of a collision between the aircraft and the floating platform while the floating platform is in flight.

In an embodiment, a computer-implemented method may include obtaining a flight-patch vector of an aircraft, determining, by the processor, a probability related to a plurality of flight-paths of a floating platform over a period of time based on operating parameters for the floating platform and weather data; and determining, by the processor, based on the flight-path vector and the probability related to the plurality of flight-paths of the floating platform, a time and/or a location for launch or recovery of the floating platform that minimizes a probability of a collision between the aircraft and the floating platform while the floating platform is in flight.

In an embodiment, a floating platform may include a payload having a processor in communication with a memory, the processor configured to obtain a flight-path vector of an aircraft; determine a probability related to a plurality of flight-paths of a floating platform over a period of time based on operating parameters for the floating platform and weather data; and determine, based on the flight-path vector and the probability related to the plurality of flight-paths of the floating platform, a time and/or a location for launch or recovery of the floating platform that minimizes a probability of a collision between the aircraft and the floating platform while the floating platform is in flight.

In an embodiment, a floating platform may include a payload having a communication device configured to communicate with a base station. The base station may include a device having a processor in communication with a memory, the processor configured to obtain a flight-path vector of an aircraft; determine a probability related to a plurality of flight-paths of a floating platform over a period of time based on operating parameters for the floating platform and weather data; and determine, based on the flight-path vector and the probability related to the plurality of flight-paths of the floating platform, a time and/or a location for launch or recovery of the floating platform that minimizes a probability of a collision between the aircraft and the floating platform while the floating platform is in flight.

In an embodiment, a base station may be configured to communicate with a floating platform. The base station may include a device having a processor in communication with a memory, the processor configured to obtain a flight-path vector of an aircraft; determine a probability related to a plurality of flight-paths of a floating platform over a period of time based on operating parameters for the floating platform and weather data; and determine, based on the flight-path vector and the probability related to the plurality of flight-paths of the floating platform, a time and/or a location for launch or recovery of the floating platform that minimizes a probability of a collision between the aircraft and the floating platform while the floating platform is in flight.

BRIEF DISCUSSION OF THE DRAWINGS

In the present disclosure, reference is made to the accompanying drawings, which form a part hereof. In the drawings, similar symbols typically identify similar components, unless context dictates otherwise. Various embodiments described in the detailed description, drawings, and claims are illustrative and not meant to be limiting. Other embodiments may be used, and other changes may be made, without departing from the spirit or scope of the subject matter presented herein. It will be understood that the aspects of the present disclosure, as generally described herein, and illustrated in the Figures, can be arranged, substituted, combined, separated, and designed in a wide variety of different configurations, all of which are contemplated herein.

FIG. 1 shows a schematic side elevation view of a floating platform according to an embodiment of the present disclosure.

FIG. 2 schematically depicts an embodiment of the method for minimizing the probability of a collision between a floating platform and a powered aircraft according to an embodiment of the present disclosure.

FIG. 3 schematically depicts the methods of making floating platform flight termination decisions by a processor according to an embodiment of the present disclosure.

FIG. 4 depicts a payload box and FIG. 4A depicts a schematic block diagram of the hardware contained within a payload box associated with the floating platform according to an embodiment of the present disclosure.

FIG. 5 schematically depicts a computer system implementing an embodiment of the method of the present disclosure.

DETAILED DESCRIPTION

Figure 1:
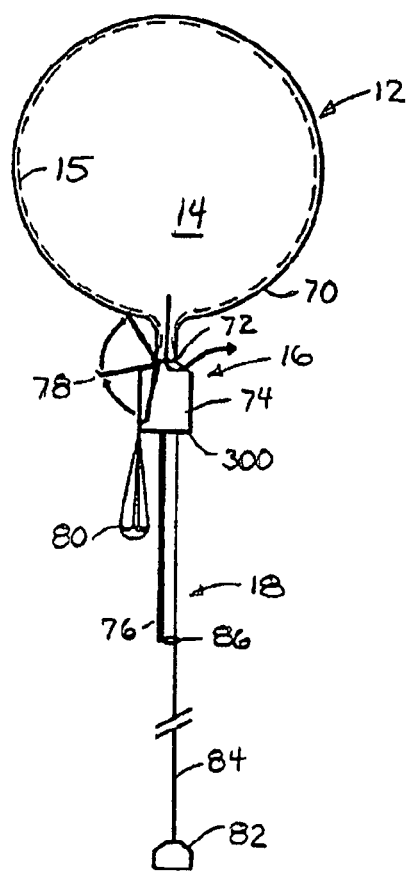

Before the present methods and systems are described, it is to be understood that this disclosure is not limited to the particular processes, methods and devices described herein, as these may vary. It is also to be understood that the terminology used herein is for the purpose of describing the particular versions or embodiments only, and is not intended to limit the scope of the present disclosure which will be limited only by the appended claims. Unless otherwise defined, all technical and scientific terms used herein have the same meanings as commonly understood by one of ordinary skill in the art.

It must also be noted that as used herein and in the appended claims, the singular forms "a", "an", and "the" include plural reference unless the context clearly dictates otherwise. Thus, for example, reference to a "balloon" is a reference to one or more biomarkers and equivalents thereof known to those skilled in the art, and so forth. Nothing in this disclosure is to be construed as an admission that the embodiments described in this disclosure are not entitled to antedate such disclosure by virtue of prior invention. As used in this document, the term "comprising" means "including, but not limited to."

A "floating platform" as used herein refers to a platform configured to float in earth's atmosphere. It is to be noted that in various embodiments described herein, the phrase "floating platform" refers to platform, and that in a given embodiment, the platform may be floating in the earth's atmosphere, ascending through the earth's atmosphere, or descending through the earth's atmosphere. A "free-floating platform" as used herein refers to a floating platform without substantial control over longitudinal or latitudinal movement. A floating platform, in various embodiments, may include, without limitation, an aircraft with a payload, partial lift platforms (with or without propulsion), powered lighter-than-air devices (with or without propulsion), and so forth.

As used herein, the term "aircraft" includes, without limitation, a vehicle capable of aerodynamic flight such as, for example, powered and unpowered crafts, air planes, helicopters, gliders, and the like; lighter-than-air devices; thrust-only vehicles such as, for example, hovercrafts, vertical take-off and landing aircrafts, and the like; ballistic trajectory vehicles such as, for example, rockets, missiles, dropped items, and the like; and/or any combination thereof.

As used herein, the term "lighter-than-air device" (LTA device) refers to a device that has an average density less than that of air at the sea-level. Therefore, buoyant forces pushing a LTA device up are greater than or equal to its gravitational pull. A LTA device without a payload, therefore, rises if allowed to freely float. Examples of LTA devices include, but are not limited to, balloons, ballooncrafts, blimps, aerostats, zeppelins, airships, dirigibles, jimspheres, hot air balloons, sounding balloons, free drifting balloons, meteorological balloons, etc.

As used herein, the term "payload" refers to a part of the floating platform and includes, without limitation, various electronic, mechanical and electromechanical components, a structural frame or enclosure for the various components, a release mechanism for releasing the components or the entire payload from the platform, and the like. In various embodiments, portions and components of the payload may be located in separate parts of the platform (e.g., at the bottom of the on top of the aircraft, on or inside a lifting gas envelope of a balloon, etc.).

As used herein, "float location" of a floating platform refers to the location with respect to earth's surface (e.g., latitude and longitude coordinates, and such) at which the floating platform is floating in the earth's atmosphere. "Float altitude" refers to the height with respect to sea level, at which the floating platform is floating.

"Rise rate", interchangeably used with the term "ascent rate" of the floating platform refers to the rate at which the floating platform rises in the earth's atmosphere. Ascent rate is typically measured in feet/minute or meters/minute. Likewise, "descent rate" refers to the rate at which the floating platform descends through the earth's atmosphere towards the earth's surface.

A "recovery system" as used herein, refers to components of the platform that may be activated during recovery of one or more portions or components of the payload. Examples of recovery system may include, but not limited to, parachutes, streamers, drag creating devices, gliders, steerable parachutes, flying wing(s), powered and unpowered aircrafts, and the like, or any combination thereof.

As used herein, a processor refers to a machine for data processing. For example, the processor could be a microprocessor chip.

Unmanned lighter-than-air ballooncraft have been used for many years to perform tasks such as near space research and meteorological measurements. Such ballooncraft have even carried payloads with instrumentation that sometimes includes radio transmission capabilities.

Generally, launches and recoveries for floating platforms are performed without any knowledge of an aircraft that may be near the ascent, float, or descent paths. Although it is possible to contact the FAA to coordinate each flight, this process can take many days for each flight, costing significant resources and delays.

The Federal Aviation Administration (FAA) has put regulations in place designed to limit the potential damage to an aircraft if a collision with a floating platform should occur. The limitations on floating platform may be found in the FAA CFR Title 14, Part 101.

All commercial aircraft, all instrument flight rules (IFR) aircraft, all aircraft operating in Class B or C airspace, and all aircraft operating above 18,000 feet are required to carry an aviation transponder. Every time a transponder-equipped aircraft is "painted" by FAA radar, the transponder transmits its current altitude and identification code. This allows the radar to determine not only the aircraft's position, but also the aircraft altitude and identification. One type of conventionally available collision avoidance device for aircraft decodes the return messages of other aircraft in the area and calculates and displays their distance and altitude to the pilot. Further, the FAA will provide aircraft position, altitude, and speed for all aircraft carrying transponders in near real time (under a minute delay) through the Aircraft Situation Display to Industry (ASDI) data feed. ASDI is provided through a virtual private network (VPN) link to any user free of charge with proper access rights.

Balloons that are exempt from Federal Aviation Regulation (FAR) 101 do not report their location to the FAA. Instead, launches have generally relied on the low probability of collision, and the low weight and density of the payload that would cause little damage if a collision should occur. As the uses of ballooncrafts expand (e.g, for providing communications and/or surveillance services), however, the payload weight carried by the ballooncrafts has increased (e.g, including communications equipment, batteries, antennas, processors, and so forth). "Blind" launches, therefore, may not necessarily be safe. Accordingly, systems and methods are provided herein, for minimizing the probability of collision between an unmanned ballooncraft and a powered aircraft.

Disclosed herein are systems and methods for predicting optimal launch and/or recovery windows for a floating platform.

FIG. 1 shows a schematic side elevation view of a floating platform 12 in an embodiment in which the low-density gas enclosure 70 may be an extensible balloon 70. An extensible balloon filled with hydrogen, helium, natural gas, or another suitable low density gas or mixture adequately provides lift for the free-floating platform. The extensible balloon is released with a diameter of about six feet and expands to about thirty two feet across at about 100,000 feet altitude. It will be noted that other lighter-than-air enclosures, such as blimps, aerostats, zeppelins, airships, dirigibles, weather balloons, jimspheres, hot air balloons, sounding balloons or meteorological balloons might also be used in place of the proposed extensible balloon 70. It is expected that a total platform weight, including the payload box 300, altitude control vent mechanism 72, meteorological package 82, antennae 76 and meteorological cable connection 84, may be in excess of about 15 lbs. In some embodiments, the cable 84 may be a fiber optic cable having a suitable length (e.g. about 25 meters) so that the meteorological data collection package 82 can be sufficiently distanced from the balloon 70 to reduce the effect of turbulence caused by the balloon on the meteorological data sensed by the meteorological package 82. The fiber optic cable 84 may be used to transmit the meteorological data from meteorological package 82 to the communications unit 74. Advantageously, the use fiber optic cable prevents arcing which may occur in a metal wire due to the high electric field potential when passing through thunderclouds. Alternatively, 82 may be a ballast container in which ballast may be released as required.

There are numerous types of low-density gas enclosure devices that might be considered useful for the devices and systems described herein. Among the potentially preferred types of balloons are rubber pressure balloons, zero pressure balloons, internal air bladder balloons, adjustable volume balloons and super pressure balloons. Each type of these balloons has different advantages and disadvantages and, for purposes of presently disclosed embodiments, any of the various types of balloons may be potentially used depending on factors such as desired duration of flight, total platform weight, and so forth.

In some embodiments, rubber pressure balloons may have a stretchable rubber membrane containing the lifting gas that allows the balloon to increase in size with decreasing external air pressure as the balloon rises. This is the most common type of weather balloon. Primary advantages of such balloons include low cost and common accessibility. These balloons are somewhat fragile and they have delicate handling requirements and also low extended reliability. Further, the use of such balloons requires venting of the lifting gas to prevent bursting upon reaching desired altitudes.

In some embodiments, zero pressure balloons may include an initially loose bag, usually made from a plastic such as polyethylene or Mylar. As the external air pressure decreases, the bag increases in volume. In such balloons, once the bag reaches its whole volume, gas must be vented to prevent to the balloon from bursting since the bag material does not stretch. Although this type of balloon may be more reliable than the rubber balloons over longer durations, and provide less diffusion of the lifting gas, such balloons are currently between about four to ten times more expensive. Thus, although the rubber balloon might be more preferred for purposes of low cost platforms, the zero pressure balloon also provides a useful enclosure for lifting the platform up and has certain advantages over the rubber pressure balloons.

In various embodiments, internal air-bladder balloons may include a flexible balloon containing air enclosed in a fixed volume balloon contain a lifting gas. Air is pumped into the inner-flexible balloon, which compresses the lifting gas trapped in the fixed volume balloon, thereby decreasing the overall lift. Air is let out of the inner-flexible balloon to increase lift. Typically, blimps adjust lift using this principle. This type of balloon has certain advantages as there is no lift gas lost when reducing lift and it is potentially more reliable than rubber balloons. Such internal bladder balloons, however, are more costly due to extra balloon, pump and extra required power for operating the altitude control mechanism.

In some embodiments, adjustable volume balloons may include a fixed volume containing the lifting gas and a mechanical way of reducing the volume of the balloon. By decreasing the volume, the lifting gas is compressed, thereby decreasing the lift. The volume may be reduced any number of ways, including an adjustable line inside the balloon from the top of the balloon volume decreases. This has less diffusion of the lifting gas, theoretically, lifting gas is not lost when reducing lift and it may be more reliable than rubber balloons. Adjustable volume balloons, however, are significantly more costly due to the mechanical volume reducing mechanism and further, may require extra power for operation of such a mechanical volume-reducing mechanism.

In some embodiments, super pressure balloons may have a fixed volume. They are called super pressure balloons because they do not expand to match the decreasing exterior pressure. They are built strong enough to hold the increased pressure. Super pressure balloons can achieve extremely long float lies because they do not need to vent gas to prevent bursting and they typically have very low membrane gas diffusion. These types of balloons have the highest cost. They, however, are one of the most reliable balloons, with little loss of lifting gas. These balloons may have an internal air bladder as well.

In various embodiments, the payload may include, without limitation, communication electronics such as one or more antennas and routers; one or more processors; one or more batteries; one or more power supplies; an on-board data storage such as a memory; one or more photovoltaic cells or panels; radar system(s); a positioning system such as a global positioning system and/or a star-tracking system; motion sensors such as accelerometers, magnetometers, gyroscopes, etc.; optical systems such as lights, video and/or still cameras; environmental sensors for measuring parameters such as pressure, humidity, temperature, altitude, and/or wind-speed; an altitude control system; a launch and/or recovery window prediction system; a payload splitting system; and the like.

Disclosed herein are methods, devices and systems for predicting a probability of collision between floating platform and a powered aircraft. The method further provides mechanisms for adjusting operating parameters for the floating platform to minimize the probability of collision.

Figure 2:
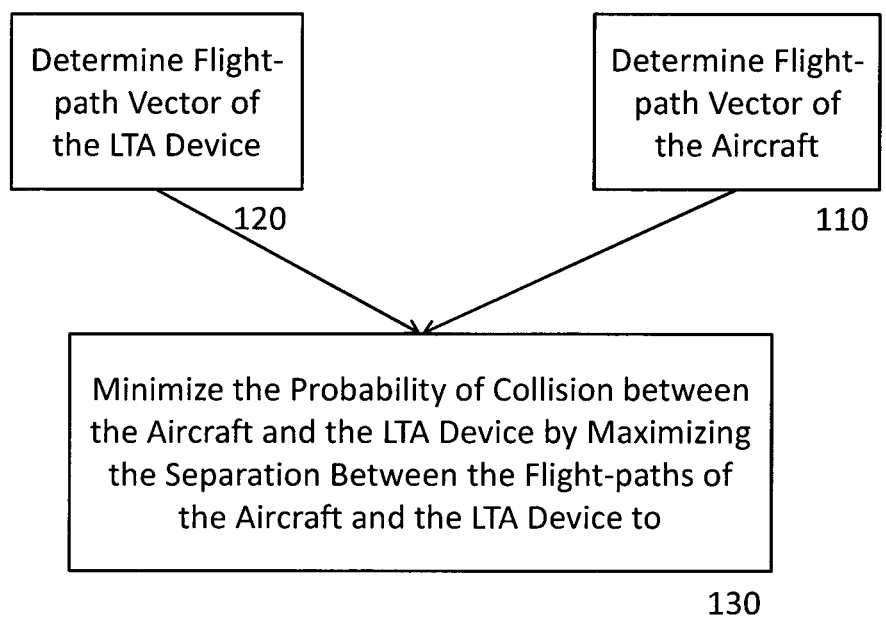

A method for minimizing the probability of a collision between a floating platform such as a ballooncraft and a powered aircraft is described herein. FIG. 2 schematically depicts an embodiment of the method. The method includes: (i) at block 110, determining a first flight-path vector of the aircraft; (ii) at block 120, determining a second flight-path vector of the floating platform based on one or more operating parameters for the floating platform and weather data; and (iii) at block 130, maximize the separation between the first flight-path vector and the second flight-path vector by adjusting the one or more operating parameters of the floating platform. In an embodiment, the method further includes predicting a launch (and/or recovery) window for the floating platform based on the probability of collision.

The flight path of a powered aircraft can be predicted using data available from a public database such as, for example, provided by an aviation authority (e.g., FAA). In an embodiment, a flight path for a powered aircraft is predicted based on origin, destination and take-off (or landing) time information for the aircraft as relayed by FAA. In another embodiment, the flight path can be determined and/or predicted using a VHF Omnidirectional Radio Range (VOR) signal of the aircraft. The location and altitude of the aircraft as a function of time can, then, be expressed as an aircraft flight-path vector at block 110.

The flight path of aircraft may also be estimated from knowledge of recurring or regularly scheduled flights or any other means currently available or developed in the future of knowing an aircraft's flight plan or current flight path.

VOR is a type of short-range radio navigation system for aircraft, enabling aircraft to determine their position and stay on course by receiving radio signals transmitted by a network of fixed ground radio beacons, by utilizing data from VOR a receiver unit. A VOR ground station sends out a master signal, and a highly directional second signal that varies in phase 30 times a second compared to the master. This signal is timed so that the phase varies as the secondary antenna spins, such that when the antenna is 90 degrees from north, the signal is 90 degrees out of phase with the master. By comparing the phase of the secondary signal to the master, the angle (bearing) to the station can be determined. This bearing is then displayed in the cockpit of the aircraft, and can be used to take a fix as in earlier radio direction finding (RDF) systems, although it is, in theory, easier to use and more accurate. This line of position is called the "radial" from the VOR. The intersection of two radials from different VOR stations on a chart provides the position of the aircraft. VOR stations are fairly short range: the signals have a range of about 200 miles.

In an embodiment, the method includes obtaining weather data including, for example, wind velocities at various altitudes over a geographical area. If the geographical location (and/or altitude) of the floating platform is known, the weather data can be used to predict a flight path of the floating platform. The weather data may be obtained using any available source such as, for example, other floating platforms that have been previously launched, National Weather Service (NWS) weather data, NOAA weather data, and the like.

Operating parameters of the floating platform include, but are not limited to, time and/or location of a launch, rate of ascent, rate of descent, time and/or location of drop (recovery), float altitude, float location, and the like. The operating parameters of the floating platform can be controlled using various systems available on the floating platform.

The floating platform flight path vector can be obtained using the rate of ascent or descent, float altitude, float location, and wind speeds and directions at the location of the floating platform. Based on wind speeds at various altitudes around that location, and based on the rate of ascent of the floating platform (which is dependent on the type and volume of gas within the enclosure as well as the propulsion capabilities of the floating platform), one can predict the location and altitude of the floating platform at a future time. The location and altitude of the floating platform as a function of time can, then, be expressed as a floating platform flight-path vector at block 120.

In an embodiment, the floating platform flight path vector can be obtained using, for example, the platform's inertial navigation system (INS), GPS, star-trackers, etc.

An embodiment disclosed herein relates to a floating platform rise rate control system. For example, a typical NWS balloon system, as is well known, consists of a rubber extensible balloon filled with a lifting gas, a parachute tied to the balloon, a line extending down from the parachute and a radiosonde tied to the end of that line. The radiosonde collects and transmits weather related data down to a ground station as the balloon system rises through the atmosphere.

The NWS requires that weather balloons rise at a standard rate of about 1,000 feet per minute. This is nearly impossible to maintain throughout the balloon's rise due to many factors including the variance with altitude of the pressure and temperature of both the lifting gas and the ambient air, the variance in the balloon material, the manufacturing process, and the physical change in the size of the balloon itself as the balloon rises.

In addition, a significant number of NWS weather balloons do not obtain the desired altitude of 100,000 feet because, among other factors, the balloon expands significantly when obtaining the higher altitudes, becoming thin and many times bursting early for the same reasons as listed above. If the amount of gas could be reduced at the higher altitudes, the chance of balloon burst would be decreased.

Some embodiments described herein utilize a rise rate control system to vent the lifting gas as needed to slow the balloon's ascent to no more than 1,000 feet per minute.

Additionally, by venting the lifting gas, the balloon size is reduced, increasing the probability of reaching the desired 100,000-foot altitude without bursting.

The rise rate control system consists of a venting mechanism attached to the neck of the balloon that can release lifting gas from the balloon, a vent actuator for opening and closing the venting mechanism, an altitude sensor for determining the altitude and rise rate of the balloon system, and a comparing mechanism or circuit to control the vent actuator to cause the vent to release some lifting gas when the desired rise rate is greater than the desired value.

In one embodiment, a GPS unit provides the processor with rise rate information. The processor compares the current rise rate with the desired rise rate stored in the processor's memory. For the NWS balloon systems, the desired rise rate is approximately 1,000 feet per minute. If the current rise rate is higher than the desired rise rate, the processor directs the actuator to open the vent until the desired rise rate is achieved.

Additionally, a ballast system containing a ballast container, ballast, and a ballast actuator could be added to the rise rate control system. The processor compares the current rise rate with a minimum desired rise rate stored in the processor's memory. If the current rise rate is lower than the desired minimum rise rate, the processor, may activate the ballast actuator to drop ballast until the rise rate increases to the desired value.

The processor may first process the rise rate data coming from the GPS unit by filtering the rise rate values. This filtering may be necessary as the GPS data may be noisy. Additionally, erroneous data may be present and need to be removed from the GPS data. The need for filtering or removing of erroneous data will vary with the different makes and models of GPS units. Alternatively, mechanical means for determining the rise rate may also be used instead of using rise rate information from a GPS unit.

Similar, but inverse systems can be implemented for controlling the descent rate of a floating platform. By appropriately controlling the systems that control rate of ascent and descent together, a floating platform can be maintained at a fixed altitude or within a range of altitudes. One skilled in the art will be able to envision the various embodiments therefor.

In other embodiments, it may be desirable to terminate the flight of a floating platform because of one or more reasons, e.g., if the floating platform has drifts outside a pre-determined area (e.g, geographical boundaries, or controlled airspace), if the floating platform drifts inside of or within a certain distance of a restricted or undesirable area, if the floating platform moves outside a pre-determined altitude range (e.g., drops below an certain altitude because of a leak), if the floating platform is moving too fast or too slowly in horizontal directions, if one or more of the systems in or on the payload fail, if power fails, if the communication link fails, or if a collision with an aircraft is probable based on either its current or estimated flight path or current vectors.

Figure 3:
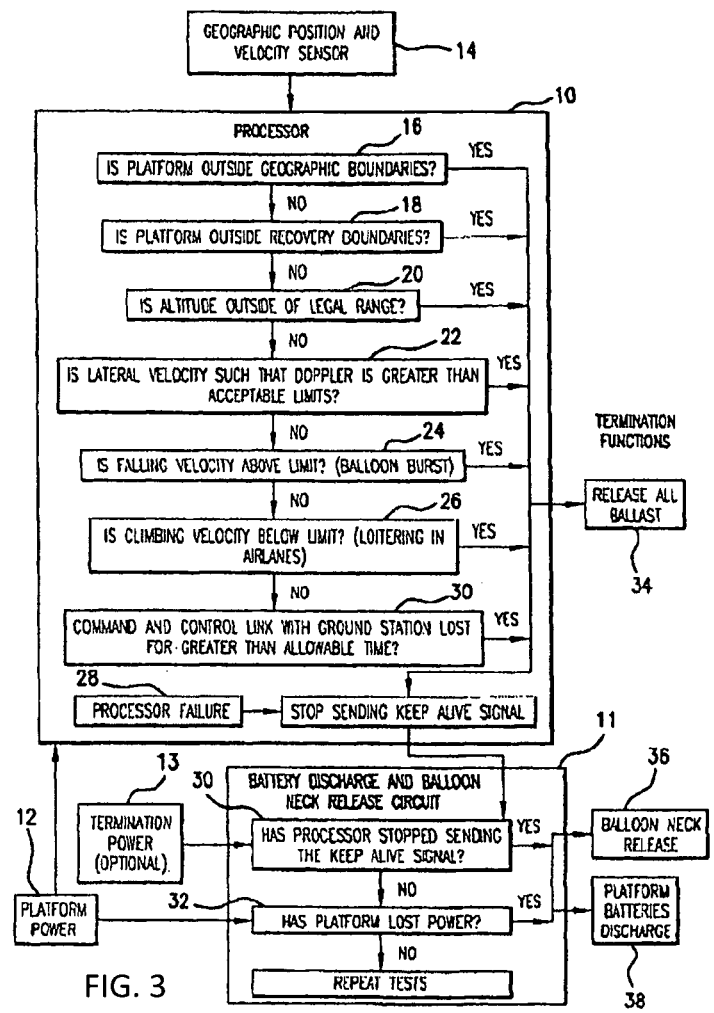

FIG. 3 schematically depicts the methods of making floating platform flight termination decisions by a processor.

In combination with an onboard power source 12 and GPS 14 (or other geographic locator or tracking system), a processor 10 is provided to receive position information and time change of position (velocity) information 14. The position information is compared to stored or programmed criteria information at 16, 18, 20, 22, 24, 26, 28 and 30, to determine whether termination of radio transmission and/or termination of flight should be implemented.

In an embodiment, in the context of the floating platform being in a US governed airspace, the following criteria based decisions are provided with the processor 10:

Has the platform moved or drifted outside of a certain geographic area? (See FIG. 3, at 16.)

The relevant boundaries may be frequency license borders set by the FCC as dictated by a regional or nationwide broadcasting license. The FCC prohibits transmitter operation outside such geographic borders. Additionally, a neighboring country may have restrictions on transmitted power into their country from a foreign transmitter. For example, Mexico prohibits transmit power levels above −99 dBm on certain frequencies into Mexico from the United States. These restrictions are not hard for terrestrial towers to comply with as the towers can install and adjust directional antennas once during installation and not have to adjust them again thereafter. This is quite different for a free drifting high altitude ballooncraft containing a transmitter as the position and altitude may be constantly changing and may require the platform to stop transmitting while still inside the United States, but within a protective number of miles of the United States-Mexico border. Additionally, it may be desirable to take action if the floating platform drifts inside of or within a certain distance of a restricted or undesirable area such as an area in which recovery is difficult or an area in which aircraft are prohibited. Thus, it may be desirable to terminate flight and/or transmission if the platform moves into or outside certain geographic areas.

Is the platform moving outside of boundaries that would significantly reduce the probability of recovering the platform? (See FIG. 3 at 18.)

As payloads costs may be significant, from $50 to $150 for a typical weather service radiosonde, up to several hundreds of dollars for a transceiver platform, and up to many tens of thousands of dollars for a scientific payload, recovery may be important both financially and for environmental reasons. A platform may encounter strong winds especially in the jet stream as it descends from high altitudes. In order to keep the platform from drifting out of the country on descent, artificial borders that take into account the winds during descent can be used. Also, boundaries of large bodies of water such as the great lakes, seas and oceans the crossing of which might hamper or prevent recovery of the platform upon normal decent, may be taken into account for termination of flight purposes.

Has the platform fallen below or risen above a set altitude range? (See FIG. 3 at 20)

Most scientific and weather balloons reach altitudes above 60,000 feet. The FAA regulates airspace below 60,000 feet and discourages free floating craft or uncontrolled flight craft from loitering, especially in commercial air lanes, as they present a hazard to commercial planes. Current NWS weather balloons do not have the capability to terminate the flight if they start to hover below 60,000 feet. Even the large-scale scientific balloons may become errant and free drift below 60,000 feet.

Is the platform velocity sufficient to create an unacceptably large doppler shift in the transmission frequency? (See FIG. 3, at 22)

A ballooncraft traveling in the jet stream may reach speeds of over 180 miles per hour. This creates a Doppler shift in the frequencies received on the ground. The FCC regulates the amount of total frequency drift allowed on transmissions. Doppler shift contributes to this total frequency drift and if great enough can cause the transmitter to transmit out of its allowed band. Therefore, it may be desirable that the payload be able to immediately stop transmitting past the speed at which the Doppler shift becomes too great.

Does the platform fall rate indicate a balloon burst? (See FIG. 3, at 24.)

A fast fall rate indicates that the balloon has burst and that the platform is falling. Transmission from the platform may need to be terminated in such a situation. Alternatively, a homing beacon transmission may be initiated.

Is the platform rising too slowly during ascent? (See FIG. 3, at 26.)

This indicates that the gas enclosure of the floating platform is under-filled or leaking. A slow rise rate may present a danger to aircraft by loitering excessively at one altitude particularly at an altitude in designated air lanes. Flight termination may be optimal in such situations.

Has the processor, the position finding equipment, or the primary power failed? (See FIG. 3, at 28.)

A GPS, star tracker, or system power failure should initiate an on-board termination. The platform must be able to terminate without processor control or power to prevent the platform from being lost without a trace and thereby, potentially pose hazard to commercial flights.

Have command and control communications been lost? (See FIG. 3, at 30.)

Without command and control from the ground, the payload should cease transmission and the flight should be terminated.

The systems and devices disclosed herein detect the foregoing conditions by comparing current position, velocity, and operating conditions to stored, programmed or calculated criteria using an onboard processor or controller. The systems and devices utilize a GPS unit and a processor to determine the current platform's geographic coordinates and velocities. A GPS unit or pressure sensor determines the platform altitude. The processor algorithms will implement the complete set of conditions listed above causing the ballast to be released at 34, the transmitter to be shut off at 38 and the flight terminated at 36 upon detection of a stored, programmed or calculated termination criteria. Under conditions of a power loss or processor failure, the transmitter will also be shut off at 38, and the flight will be terminated at 36. The methods and mechanisms for the termination actions are described more fully below.

A separate termination controller 11, which may be under separate power 13 monitors the primary platform power at 32 and monitors processor functions at 30 to determine if the processor 10 is functioning properly. Both the primary processor 10 and the separate termination controller 11 have the ability to terminate transmissions, by discharging the primary platform batteries at 38 and to terminate the flight by releasing the balloon or activating the release mechanism disclosed herein at 36. The separate power source 13 may advantageously comprise a very small environmentally acceptable battery such as an alkaline watch battery.

In such embodiments, a steerable recovery system may be deployed for recovering the floating platform. Such recovery system may include, without limitation, autonomous, GPS guided parachutes and gliders. Steerable parachutes and gliders are important for the recovery of expensive payloads, safely avoiding populated areas during descent, and for specific target delivery applications. Generally, the control systems for these steerable recovery systems are not designed for low cost as the payloads themselves are very expensive and the control system is a fraction of the overall cost. Methods described herein reduce the overall cost of an autonomous steerable recovery system by utilizing algorithms that allow operation without the need for a compass and airspeed indicator.

In an embodiment, steerable recovery systems require five inputs; (1) the current position of the steerable body; (2) the target position where the steerable body should land; (3) the ground track vector; (4) the local wind vector; and (5) the flight vector. The three different vectors are used in the control of an autonomous steerable recovery system, the Ground track vector which is the direction and speed that the Recovery system is moving with respect to the earth's surface, the Local wind vector which is the direction and speed of the wind at the Recovery system with respect to the ground, and the Flight vector which is the direction and speed the Recovery system is moving with respect to the local air at the recovery system. Typical autonomous, GPS guided recovery systems use GPS to provide the Ground track vector. An onboard compass supplies the Flight vector direction, and the flight vector speed is either provided by a pitot tube or by estimating the forward travel from the glide ratio and current fall rate. With these two vectors, the Local wind vector can be determined as the Ground track vector is the sum of the winds acting on the Recovery system (Local wind vector) and the speed and direction in the local air of the Recovery system (Flight vector).

A GPS supplies the Recovery system's current position and Ground Track vector. The Ground track vector is measured before starting the turn so that it is measured in non-turning flight. In an embodiment, a compass is used to determine the Flight vector's direction and the Flight vector's speed is either calculated from the descent rate and the estimated glide ratio of the Recovery system or by using an airspeed sensor. The measured Flight vector is one of the two components that sum together to form the Ground Track vector. The second component, the Local winds vector, is determined by subtracting the measured Flight vector from the Ground track vector. In an embodiment, the Local winds vector is determined by effectively nullifying the Flight vector and calculating the new Ground Track vector over the period of time the Flight vector is nullified. In order to null the Flight vector, the Recovery system is placed into a constant turn for one full revolution. If no local winds are present (Local vector equals zero), the path of the Recovery system with respect to the ground is a circle. Over the total period of time of the turn, the effective Ground track vector is zero as the Recovery system ended up in the same position in latitude and longitude that it started. Since the Ground track vector was measured to be zero during the turn, the winds are calculated to be zero since the Ground track vector equals the sum of the Local winds vector and the Flight vector and the Flight vector was nullified by turning in a circle over the period of the turn. If local winds are present, the path of the Recovery system is a circle shifted by the local winds.

For example, if the Local Winds vector is from the west (heading 90 degrees). The path of the Recovery system during the complete circle is pushed to the East by the Local wind vector. By measuring the start and end positions during the turn and dividing by the time it took to complete the full circle, the Local wind vector is determined. Subtracting the Local winds vector from the Ground track vector taken in level flight (before the start of the turn) the Flight vector is determined. By the steering method disclosed herein, the payload of the steerable recovery system need not have a compass and air speed indicator, which are required in conventional systems to determine the Flight vector.

It is to be noted that the GPS may be unable to provide the Flight vector direction because GPS's position and Ground track vectors are in relation to the earth's surface and give no information as to the Recovery System's flight through the air around it. The Recovery system's flight direction is in reference to the local air. For example, if the Recovery system is facing west with a airspeed of 40 mph and the wind speed is 60 mph toward the East, GPS will provide a Ground Track vector of East at 20 mph although the steerable system is actually facing West. This is why a compass is necessary to provide the actual direction the Recovery system is facing and not the direction the recovery system is moving with respect to the ground. For the same reasons given above, the Flight vector speed must also be determined from sources other than the GPS as the Flight vector speed is the airspeed and not the Ground track speed. Therefore it is necessary either to have an airspeed sensor on the Recovery system or to estimate the Flight vector speed from the Recovery system's glide ratio.

Since the Ground track vector is the sum of the Local winds vector and the Flight vector, if the Flight vector can be removed or nullified, then the Local winds vector becomes equal to the current Ground track vector. In an embodiment where there is no compass on board the Recovery system, one complete turn is determined by monitoring the Ground track vector direction. When the vector matches that recorded at the start of the turn, one full turn is complete. Over the period of time it takes to make the full circle any component of the Flight vector is removed as it average out to zero. Therefore, the only lateral force on the Recovery system is the wind. By taking the change in position over the total time to loop, the Local wind vector is determined. The Flight vector can then be determined by subtracting the Local wind vector from the Ground track in level flight. The calculations involved in determining the Local wind vector (direction and speed) as well as the Flight direction vector follow.

Make the following measurements during flight in order to null the contributions of the Flight vector:

(1) Place the steerable parachute or glider into a constant rate of turn. The speed of the turn is not critical although the rate should be chosen to minimize the altitude change during the complete turn. This minimizes the error due to changes in the Wind vector with altitude. It is important that the turn rate be as constant as possible.

(2) Record the Ground vector, position, and time.
(3) Start Ground Vector direction (degrees)
(4) Start Ground Vector speed (m/s)
(5) Start latitude (decimal)
(6) Start Longitude (decimal)
(7) Start Time (GPS seconds)
(8) Continue the turn until the ground vector direction matches that recorded at the start of the turn.
(10) Record the current ground position, and time.
(11) End latitude (decimal)
(12End longitude (decimal)
(13) End Time (GPS seconds)
(14) Calculate the Local wind vector and the Flight vector using the method and formulas below.
(15) To return to the original direction, roll out of the turn and adjust direction to maintain the initial Ground track vector direction.
(16) To continue turning to a new Flight vector direction continue to turn the number of seconds calculated below before rolling out of the turn.
(17) Number of additional degrees of turn desired*(End Time-Start Time)/360

(18) Alternately, the appropriate Ground track vector direction can be calculated from the newly calculated Local wind and Flight vectors.

Taking the end measurements when passing through the exact heading as that of the start measurements allows the measurement period to be that of one complete turn. By flying the recovery system in a constant, complete circle any component of the Flight vector is removed from the Ground track vector for the period from Start Time to End Time. The only lateral force on the Recovery system is the Local wind. By taking the change in position over the total time to complete a full turn, the Local wind vector is determined.

The latitude and longitude change during one complete turn due to the local winds are calculated as follows:

$$Latitude\_change\_(radians)=[Start\_latitude\_(decimal)-End\_latitude\_(decimal)]*pi/180$$

$$Longitude\_change\_(radians)=[Start\_longitude\_(decimal)-End\_longitude\_(decimal)]*pi/180$$

Converting latitudinal and longitudinal change during one complete turn to the Local wind North and East components in meters per second requires the non-spherical earth model to convert latitudinal and longitudinal change to actual distances and rates. The formulas can be summarized as:

$$Radius\ of\ the\ Earth\ at\ latitude(Rn)=Ravg/(1-Eccent*(sin(latitude\_change\_(radians))2))$$

Where Ravg is the average radius of the earth=6378137 meters
and Eccent is the earth's eccentricity=0.00669437999014138

$$Local\_Winds\_North\_(m/s)=Rn*Latitude\_change\_(radians)/(End\_Time-Start\_Time)$$

$$Local\_Winds\_East\_(m/s)=Rn*cos((Start\_Latitude\_(decimal)+End\_Latitude\_(decimal))/2)*pi/180)*(Longit ude\_change\_(radians)/(End\_Time-Start\_Time)$$

Convert the Local wind components to a vector (Local winds vector).

$$Local\_winds\_direction\_(degrees)=ArcTAN(Local\_winds\_North\_(m/s)/Local\_Winds\_East\_(m/s))$$

If the Local Wind direction is negative, add 360 degrees.

$$Local\_winds\_speed\_(m/s)=SQRT((Local\_Winds\_North\_(m/s))2+(Local\_Winds\_East\_(m/s))2)$$

From the Ground track vector from GPS and the Local wind vector, the Flight vector can be determined. It is easier to subtract the Local wind vector from the Ground track vector when both vectors are converted to North and East components first:

Convert the Ground track vector to its North and East components.

$$Ground\_Track\_North\_(m/s)=cos(Start\_Ground\_Vector\_Direction\_(degrees)*Pi/180)*Start\_Ground\_Vect or\_Speed\_(m/s)$$

$$Ground\_Track\_East\_(m/s)=sin(Start\_Ground\_Vector\_Directionjdegrees)*Pi/180)*Start\_Ground\_Vector \_Speed\ (m/s)$$

Subtract the Local wind components from the Ground Track components to arrive at the Flight components.

$$Flight\_North\_(m/s)=Ground\_Track\_North\_(m/s)-Local\_Winds\_North\_(m/s)$$

$$Flight\_East\_(m/s)=Ground\_Track\_East\_(m/s)-Local\_Winds\_East\_(m/s)$$

Convert the Flight components to a vector (the Flight Vector).

Flight vector direction(degrees)=ArcTAN(Flight_North_(m/s)/Flight_East_(m/s))

If the Flight direction is negative, add 360 degrees.

Flight vector speed(m/s)=SQRT((Flight_North_(m/s))2=(Flight_East_(m/s)2)

Now the Flight vector and the Local wind vector have been separated from the Ground track vector and the steering control algorithms can use their components.

In an embodiment, the calculations above can be implemented into the control system of an autonomous Recovery system such as an autonomous, GPS guided, steerable parachute or glider. A typical system may consist of at least the steerable parachute or glider, one or more steering actuators, a GPS unit for position data, ground track, and time, a processor to perform the algorithms described above, and a power source for the processor and actuators. No airspeed sensor or compass is needed.

One skilled in the art will be able to perform calculations for LTA flight path vector during ascent along similar lines.

Returning to FIG. 2, once the flight-path vectors for the floating platform and the aircraft are known, a probability of collision between the two can be calculated for a future time and minimized by adjusting the operating parameters for the floating platform, at block 130. Minimizing the probability of collision may include maximizing the separation between the two flight path vectors by: (i) maximizing the horizontal distance between the floating platform and the aircraft at any time, and/or (ii) maximizing the vertical distance between the LTA and the aircraft at any time.

The method can be used for coordinating launch and/or recovery time and/or location of the floating platform, and float altitude and/or location of the floating platform so as to minimize potential for collision between the floating platform and an aircraft, or a potential incursion of an airspace by a floating platform.

For example, if a plurality if floating platforms are to be launched at a desired ascent rate and altitude for a set of locations, optimal launch times for each of the plurality of the floating platforms can be obtained based on the aircraft flight path data from each of the launch locations. The calculations can be performed at a single location and each of the locations can be notified about a set schedule based on the optimal launch times.

Embodiments described herein include a system, method and design for use with lighter-than-air platforms that overcome certain safety drawbacks of conventional unmanned lighter-than-air ballooncraft. The processor reduces or eliminates the chance of the platform becoming a free floating, uncontrolled transmitter by monitoring sensed coordinates and platform velocities (GPS, inertial navigation sensor, star tracker, etc.) and by comparing the sensed information to known (stored, programmed or calculated) geographic or altitude based boundaries. If the processor determines that the platform is out of its proper boundaries, termination is started. If the GPS fails, the processor also initiates termination. If the processor function unacceptably fails or if the primary power fails, termination and recovery is also automatically initiated with a secondary termination control circuit having its own small and environmentally acceptable power source. This does not require power from the primary power source of the platform.

Figure 4:
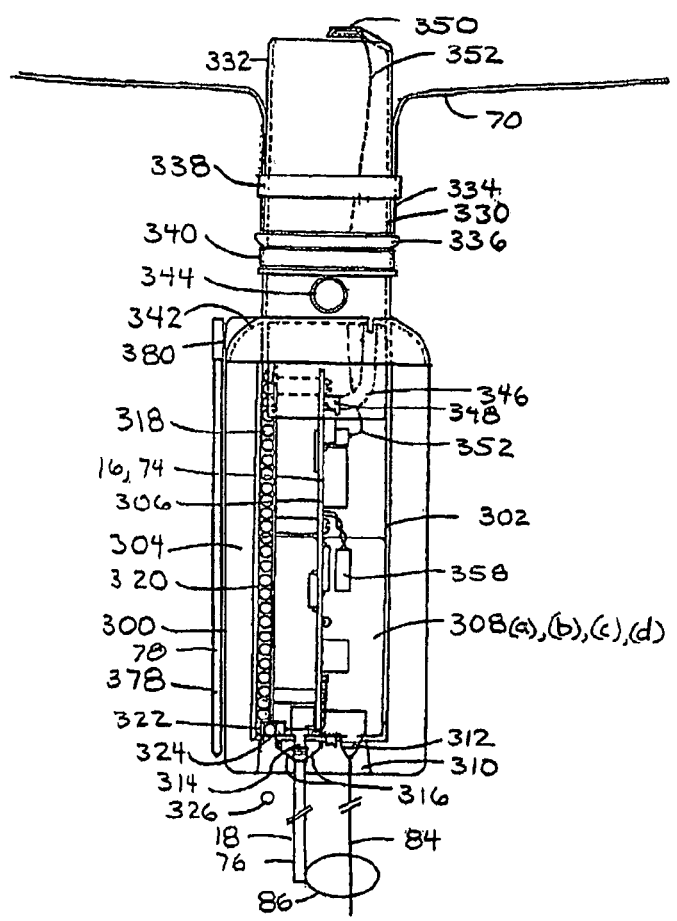
Figure 4A:
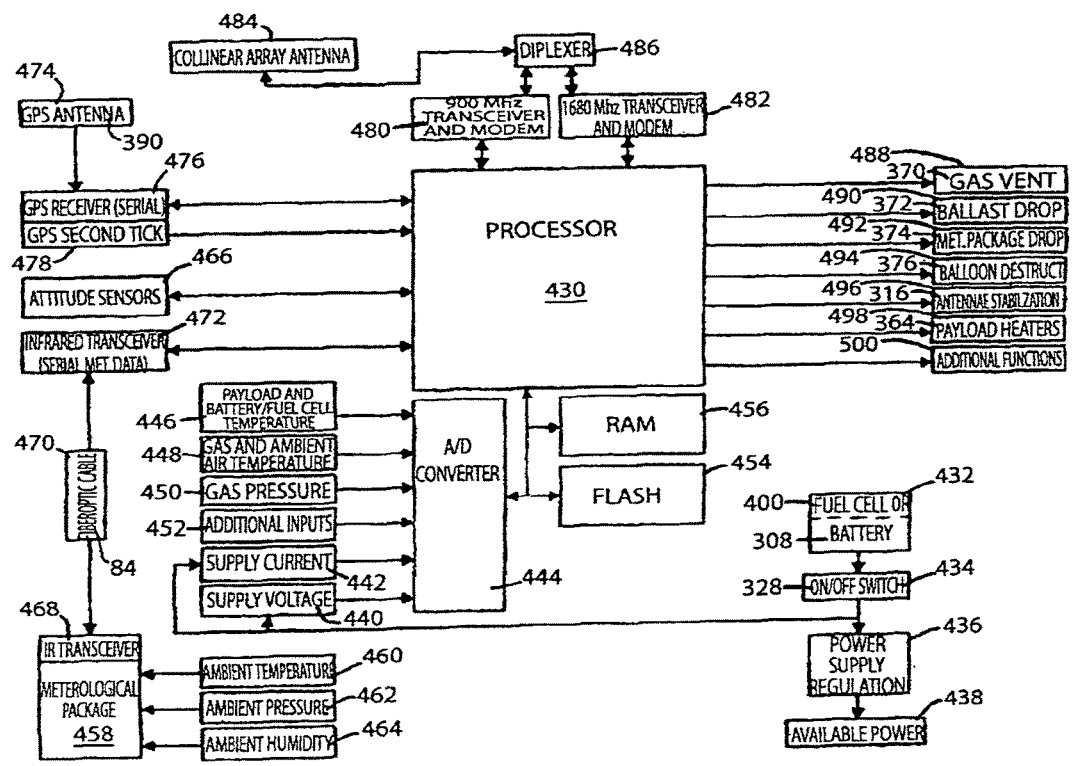

The embodiment in FIG. 4 depicts a payload box and FIG. 4A depicts a schematic block diagram of the hardware contained within the payload box and placed on or interconnected with circuit board. A processor 430 receives electrical signal input and provides electrical signal output, interacting with a plurality of components for both controlling the flotation altitude, temperature, balloon destruction, ballast drop, etc. of the platform and also for receiving, processing and transmitting communication signals received and transmitted to and from ground stations, personal communication devices or other information communications. Initially, block 432 represents either the batteries 308 or the fuel cell 400. Block 434 represents the on/off switch 328 to activate providing power to a power supply regulation circuit 436 with output available power 438. For clarity, individual power connections to various operational and control devices have not been shown in all instances. Power is provided to the supply voltage sensor at block 440 and current supply sensor block 442, which provide information to an analog to digital converter 444. The analog to digital converter also variously receives information from the payload and battery fuel cell temperature gauge at block 446, both gas and ambient air temperature readings at block 448 and gas pressure at block 450. Additional analog informational signals are generally represented by block 452. Digitally converted information is variously provided to and received from flash memory at block 454 and random access memory (RAM) at block 456. From A/D converter 444 and also from the flash memory 454 and from RAM memory 456, the processor has access to all the various input control data. During the ascent of the floating platform, the meteorological package represented by block 458 receives appropriate weather information including ambient temperature 460, ambient pressure at 462 and ambient humidity at 464. The antenna stabilization 316 represented by block 496 may rely upon the attitude sensor information that is part of the floating platform control system at 466 to stabilize the antenna 76. Information sensed or gathered by the meteorological package 458 is transmitted. For example, the infrared transceiver 468 through a fiber optic cable at block 470 corresponding to the physical fiberoptic cable 84 and a processor infrared transceiver 472 by which serial meteorological data is transferred to the processor 430 for appropriate transmission to ground terminals during the ascent of the floating platform with the meteorological package 458 attached. A GPS antennae block 474, corresponding to physical GPS antennae 390, communicates through a GPS receiver 476, indicated as a serial port and further synchronized with a GPS clock or seconds tick at block 478. Thus, the position at particular times is provided to the processor. This positioning information is coordinated with the other meteorological input for determining wind speeds steering any part of the ascent, thereby corresponding those wind speeds to particular altitudes and geographical locations during the ascent.

Communications are controlled by processor 430, preferably using both a 900 MHZ transceiver and modem 480 and a Gateway transceiver and modem 482 signal to and from co-linear array antennae 484 are interfaced through a diplexer 486control information received at co-linear array antennae 484, therefore transferred through the diplexer and one of the appropriate frequency transceivers to the processor 430 with input information from ground signals and also from input information from the onboard sensors as provided through A/D converter 444, the GPS position information from 476, the GPS time information 478 and the attitude sensor information 466, various functions of the floating platform can be controlled. Including the gas vent at block 488 corresponding to the gas vent actuator 370. Also the ballast drop is controlled at block 490 corresponding to the physical ballast drop actuator 372. The meteorological package drop controlled schematically at block 492 corresponding to the package drop actuator 374. The balloon destruct control is depicted at block 494 corresponding to the destruct actuator 376. Antennae stabilization may be affected according to controls at block 496 corresponding to the antennae stabilization mechanism 316. Payload temperature controls, both heating and cooling, may be controlled at block 498 corresponding to heaters and coolers 364. Additional functions as may be additionally included, are provided with controls at block 500.

Figure 5:
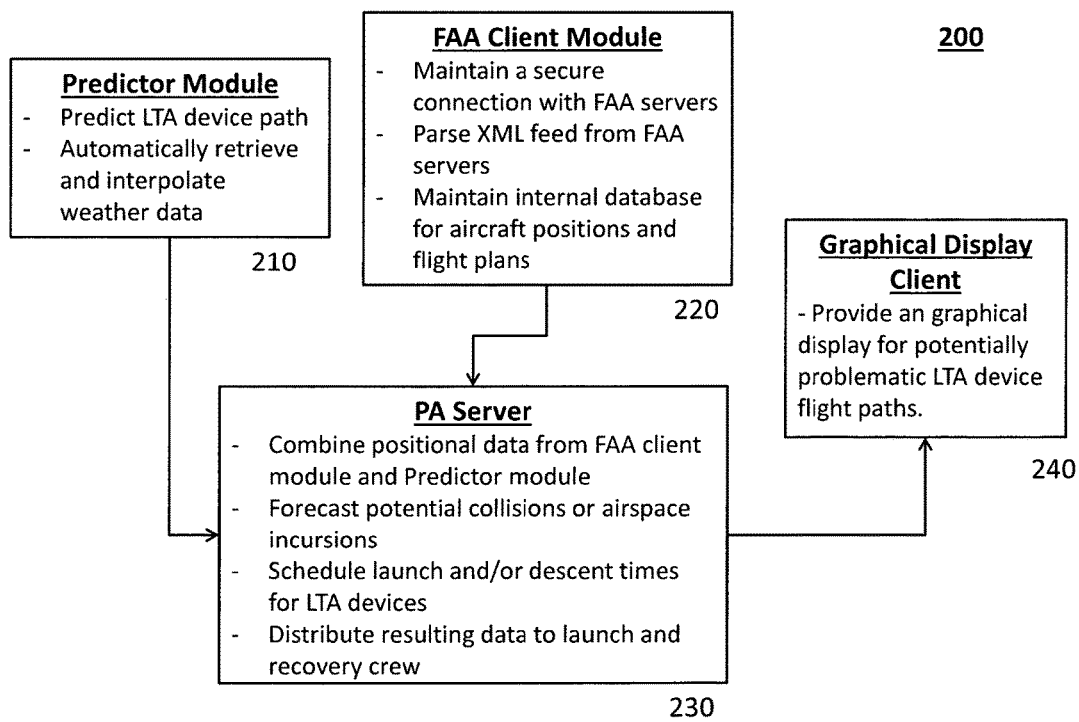

FIG. 5 schematically depicts a computer system implementing an embodiment of the method described herein. The computer system 200 includes Predictor Module 210, FAA Client Module 220, Predictive Analysis (PA) Server 230 and Graphical Display Client 240.

Predictor Module 210 provides a flexible and extensible Application Programming Interface (API) for predicting paths of the floating platform to analyze future scenarios in order to determine the probability of airspace incursions. Predictor Module 210 is configured to automatically retrieve and interpolate weather from a weather data provider such as the National Oceanic and Atmospheric Administration (NOAA). In an embodiment, Predictor Module 210 can be implemented as part of the system, whereas, in another embodiment, Predictor Module 210 can be implemented as a standalone client. For instance, as a standalone client, (e.g, an application for a mobile device) Predictor Module 210 can be used to predict and/or visualize flight-paths of floating platforms without doing anything else with that information.

In various embodiments, the weather data provided by the NOAA may be made available real-time over a direct, dedicated data connection, e.g., an internet connection using wired or wireless communication protocols. In other embodiments, the weather data may be provided at predetermined intervals as desired by a user of the system over a data connection, or using a computer-readable medium such as a non-transitory data storage. For example, a user may connect to NOAA servers using a standalone computer terminal, download requisite weather data on a non-transitory data storage such as a Compact Disc or a Solid-State Memory, and provide the downloaded data to Predictor Module 210. In yet other embodiments, Predictor Module 210 may connect to NOAA servers and request for relevant weather data as needed. Other embodiments are also possible. The weather data may be in any computer readable format and may be converted to any desired format before processing.

FAA Client Module 220 obtains aircraft flight related data from a provider of aircraft flight related data, e.g., the Aircraft Situation Display to Industry (ADSI) servers of the Federal Aviation Administration (FAA). The data may be obtained by various means. For example, FAA Client Module 220, in an embodiment, may maintain a secure connection (e.g., via a Virtual Private Network or VPN) with ADSI servers to obtain the aircraft flight data real-time or on demand. The data may be provided in any format, or as a streaming feed, e.g, as an XML feed.

FAA Client Module 220 then parses aircraft flight data available to it, and maintains an internal database for aircraft positions and flight plans. This internal database may be used when, for example, a data connection between ADSI servers and the computer system is not working or not available.

PA Server 230 combines positional data from FAA Client Module 220 along with floating platform flight data from Predictor Module 210. The combined data is then processed to provide the ability to forecast potential airspace incursions, thereby allowing for the scheduling of launch and/or descent times to minimize the possibility of airspace incursions. This information is then shared (or distributing) to launch and recovery crews to maximize safety.

Graphical Display Client 240 is used for graphically displaying information such as predicted launch and release paths that might come within a defined distance from an aircraft. Additionally, the computer system may include other software module(s) (not shown) that provide means of interacting with the PA Server.

Figure 6:
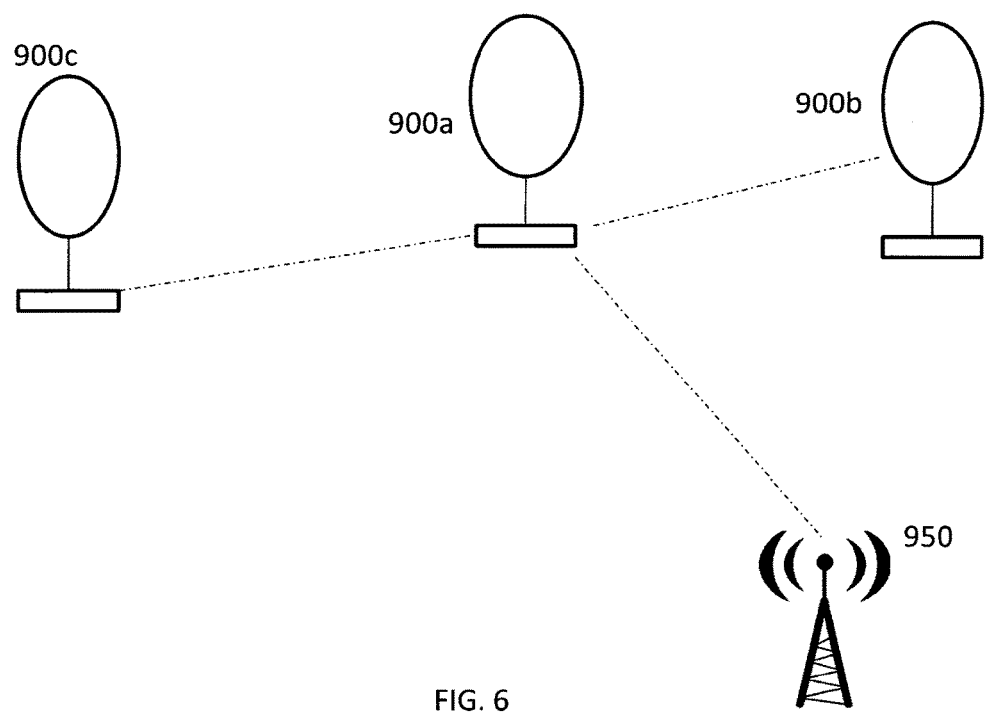
FIG. 6 depicts a schematic of a floating platform in communication with a ground station and/or other floating platforms according to an embodiment of the present disclosure.

FIG. 6 depicts a schematic of a floating platform in communication with a ground station and/or other floating platforms. Floating platform 900a may communicate with ground station 950 and/or other floating platforms 900b, 900c, etc. In some embodiments, various systems (e.g., altitude control systems) associated with floating platforms 900a, 900b, 900c etc. may be activated and/or controlled remotely via ground station 950 or any one or more of the other floating platforms. For example, in a use case scenario, there is a failure of the system for detecting aircraft on a particular platform, e.g., 900a. In such a scenario, a ground station 950, or one of the other floating platforms may still be able to detect an aircraft. Ground station 950, or one of the other floating platforms, e.g., 900b may be able to activate or control one or more systems associated with platform 900a via a communication link. Communication between platform 900a, and ground station 950 may also include other data transmission.

Figure 7:
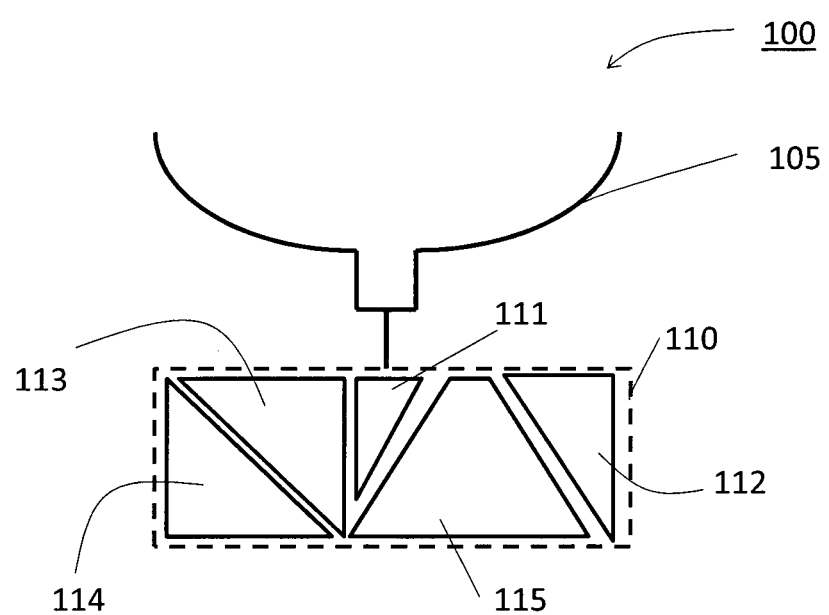
FIG. 7 depicts a schematic of a floating platform with releasably-coupled component parts, according to an embodiment of the present disclosure.

In an embodiment, as shown in FIG. 7, a floating platform 100 may include, a balloon 105, and in addition to the above mentioned components, a transponder decoder, logic circuits, release mechanisms and appropriate power supplies. These and other components may be housed in or on a payload box or an enclosure 110. Several of the payload components can be grouped together to form two or more separable components 111, 112, 113, 114, and 115 while assuring proper weight and/or density distribution for the payload. The exact placement and connections between the units can be determined by a person with skill in the art in order to assure proper weight and/or density distribution for the payload and antenna placement for the transponder.

In various embodiments, release mechanism may function to release one or more components from the payload such that the released component descends under gravity, in some cases, on a recovery system. Additionally, or alternatively, the release mechanism may function to separate one or more components from the payload without releasing them such that the separated components release from the payload, but remain attached to the platform via one or more lines or other provisions. The employed release mechanism(s) may be selected from established or new methods of separating two or more objects from each other. Release mechanisms may include, for example:

(1) Various components may be spring loaded with pull apart electrical, pneumatic, or hydraulic connectors between the components as needed. A solenoid may be configured to act as a release mechanism allowing the springs to push the components away from each other. Each component may then be configured to descend under gravity on its own recovery system (e.g. parachute or maple-leaf recovery system);

(2) Various components may be held together with a cord that laces through each component. A cord cutter (e.g., thermal cutter, spring loaded blade, magnetic release, electrically releasable glue, chemically releasable glue, etc.) may be configured to cut the cord, allowing individual components to separate and come down under gravity using a controlled recovery system. The components may also be spring loaded in order to overcome friction of electrical or mechanical connectors between the components;

(3) Various components may be held together with a cord that laces through each component. When the balloon is released from the payload components, the same release mechanism that releases the balloon may be configured to release the cord that holds the components together;

(4) Various components may be glued together (or to the payload, or platform). The glue may be electrically, or chemically releasable;

(5) Various components may be held together with a cord rolled on a motorized drum. When the motor is activated, various components may be released together or sequentially;

(6) Multiple cords may be laced through a combination of components (e.g., one cord from communications related components, one cord from weather sensing related components, one cord from altitude control mechanisms, etc.). Each of the cords may have a separate release mechanism similar to any one of the mechanisms described herein;

(7) Entire payload or groups of components may be release while connected together. The released payload may have an aerodynamic shape that causes spinning as it falls under gravity. While the payload is spinning, components are released and centrifugal forces fling components outward.

In various embodiments, one or more components of the payload may be released or separated at the same time, sequentially, or individually. In some embodiments, all of the components of the payload may be released at the same time. In such embodiments, payload may be distributed into a large number of small, low-weight, low-density components. Since the released components will, typically, be horizontally spaced apart as they descend, such a release mechanism, however, carries a risk of one another aircraft hit multiple components as the fall as the aircraft movement is essentially horizontally. On the other hand, if an aircraft is at the same altitude or immediately below the platform, such a release mechanism may push the components sufficiently apart to completely avoid the aircraft.

In some embodiments, various components may be released or separated sequentially. Such embodiments allow vertical spacing between components as they fall under gravity. Such embodiments may also allow for controlled separation of multiple components on the same line, whereby the separated components remain attached to the platform. Advantageously, since the components are on a single line, tangling of lines, and components (and in case of release of components with recovery systems) may be prevented. In an example embodiment, components are tied to each other with separate strings. Each of the strings is spooled on a single spool. Upon activation, the spool releases the components one at a time.

In some embodiments, various components may be released or separated individually. For example, a payload may include multiple batteries, each of which can be separately released or separated as mission dictates. In addition, each battery or battery may be released after it's useful life is reached. In an example embodiment, each component has a separate string with its own release mechanism (e.g., a thermal cutter). In another example embodiment, each component is separately glued to the platform using, for example, an electrically releasable glue with individual circuits to release the glue for each component. In either of the example embodiments, the separated components may be ultimately tied to the platform via one or more lines, whereby the components remain attached to the platform. Alternately, the separated components may be released from the platform, whereby the components (e.g., ballast weight) descend back to earth under gravity with the help of a recovery system.

Each of the separation and/or release sequences has its advantages and disadvantages, and the choice of a particular release/separation sequence may depend on factors such as, for example, distance of the platform from other aircraft(s), probability of released/separated components colliding with another aircraft, criticality of components with respect to functioning of the platform, need for continued functioning of the platform despite release/separation, complexity and cost of the particular release mechanism, geolocation of the platform at the time of release (e.g., if the platform is over a restricted air space, or critical infrastructure), weight and/or density distribution of the components to be released, and so forth. In some embodiment, there may be one or more redundant release mechanisms present on the floating platform. Redundancy may, in some instance, be mandated by a regulating agency.

In various embodiments, a component may remain connected to the payload or other components after separation via one or more lines. The one or more lines may include strings, wires, fiber optic cables, tubing, etc. Lines may carry power, data, gases, rotary motion, vibration, etc. to allow continued full or partial operation of the component or components connected to the line. In various embodiments, one or more of the lines may contain de-reelers or rubber components to reduce the shock upon full extension of the line/s. In various embodiments, line length and strength may be set greater than a threshold, and/or to meet a regulator requirement.

In various embodiments, one or more connectors may connect lines to components or to other lines. Such connectors may be adapted to transmit fluids, pressure, data, electrical power, light (e.g., connector for optic fiber cables), heat, rotary motion, etc. In some embodiments, connectors may slide apart, have a pre-set pull-apart resistance, have a spring contact, or may be magnetically coupled. Other connectors are contemplated.

Another embodiment is implemented as a program product for implementing systems and methods described herein. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

The foregoing detailed description has set forth various embodiments of the devices and/or processes by the use of diagrams, flowcharts, and/or examples. Insofar as such diagrams, flowcharts, and/or examples contain one or more functions and/or operations, it will be understood by those within the art that each function and/or operation within such diagrams, flowcharts, or examples can be implemented, individually and/or collectively, by a wide range of hardware, software, firmware, or virtually any combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

All references, including but not limited to patents, patent applications, and non-patent literature are hereby incorporated by reference herein in their entirety.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A floating platform comprising a free floating balloon, a payload comprising a plurality of releasably-coupled component parts, and a device comprising:
   a processor in communication with a memory, the processor configured to:
   obtain a flight-path vector of an aircraft;
   determine a plurality of estimated flight-paths of the floating platform over a period of time based on operating parameters for the floating platform and weather data, including a local wind vector of a local wind along the plurality of estimated flight-paths of the floating platform, wherein the device is configured to estimate a plurality of individual flight-paths between consecutively determined dimensional points during travel of the floating platform over the period of time;
   determine, based on the flight-path vector and the plurality of estimated flight-paths of the floating platform, a time and a location for launch or recovery of the floating platform that minimizes a likelihood of collision between the aircraft and the floating platform while the floating platform is in a flight;
   decide whether to terminate the flight of the floating platform; and
   release the plurality of releasably-coupled component parts such that the plurality of releasably-coupled component parts are configured to descend under gravity separately or in groupings smaller than the payload in entirety.

2. The floating platform of claim 1, wherein the processor is configured to determine the flight-path vector based on one or more of an inertial navigation system, a transponder, a flight schedule, optical detectors, a radar, a lidar, a VHF Omnidirectional Radio Range (VOR) signal, origin and destination of the aircraft.

3. The floating platform of claim 1, wherein the memory is configured to store a database for positions of aircrafts and flight-plans of aircrafts in a vicinity of a launch location, and along an estimated flight-path of the floating platform.

4. The floating platform of claim 1, wherein the processor is further configured to determine the flight-path vector based on data obtained from an aviation authority.

5. The floating platform of claim 1, wherein determining the plurality of estimated flight-paths of the floating platform comprises simulating a plurality of flight-paths for the floating platform based on one or more of:
   a local atmospheric data,
   a projected launch time, a projected launch location,
an operating parameter of the floating platform,
an ascent characteristic of the floating platform,
a propulsion characteristic of the floating platform,
a flight characteristic of the floating platform, and/or
a descent characteristic of the floating platform.

6. The floating platform of claim 5, wherein the local atmospheric data is obtained from a floating platform launched previously.

7. The floating platform of claim 5, wherein the local atmospheric data is obtained from a public database.

8. The floating platform of claim 1, wherein the processor is further configured to determine a possibility of intersection of a flight-path of the floating platform and a predetermined airspace.

9. The floating platform of claim 8, wherein the processor is further configured to dynamically determine a likelihood of collision between the floating platform and the aircraft after the floating platform is launched.

10. The floating platform of claim 9, wherein the processor is further configured to dynamically determine, while the floating platform is in flight, the operating parameters of the floating platform that minimize the likelihood of collision between the floating platform and the aircraft.

11. The floating platform of claim 9, wherein the processor is further configured to dynamically determine, while the floating platform is in flight, the operating parameters of the floating platform that maintain at least a predetermined separation from the aircraft.

12. The floating platform of claim 9, wherein the processor, in response to a determination that the likelihood of collision is higher than a threshold, is further configured to initiate a change in the flight-path of the floating platform.

13. The floating platform of claim 12, wherein initiating the change in the flight-path of the floating platform includes one or more of:
adjusting an ascent rate of the floating platform,
adjusting an altitude of the floating platform,
adjusting a lateral velocity of the floating platform,
adjusting propulsion of the floating platform,
adjusting a descent rate of the floating platform,
initiating a descent of the floating platform, and/or
initiating a break-up of the floating platform.

14. The floating platform of claim 1, wherein the processor is further configured to determine a time window during which, a likelihood of collision between the aircraft and the floating platform is minimized.

15. The floating platform of claim 1, wherein the operating parameters for the floating platform include launch or recovery time, launch or recovery location, ascent rate, float location, float altitude, propulsion capability, or descent rate.

16. The floating platform of claim 1, wherein the device further comprises a communication device.

17. The floating platform of claim 16, wherein the communication device is configured to communicate with a base station.

18. A method being implemented in a computer that includes a processor for controlling flight of a floating platform, wherein the floating platform comprises a free floating balloon, a payload comprising a plurality of releasably-coupled component parts, a device and a release mechanism to release one or more components from the plurality of releasably-coupled component parts such that the plurality of releasably-coupled component parts are configured to descend under gravity, the method comprising:
obtaining a flight-path vector of an aircraft;
determining, by the processor, a plurality of estimated flight-paths of the floating platform over a period of time based on operating parameters for the floating platform and weather data, including a local wind vector of a local wind along the more than one individual estimated flight-paths of the floating platform, wherein the device is configured to estimate a plurality of individual flight-paths between consecutively determined dimensional points during travel of the floating platform over the period of time;
determining, by the processor, based on the flight-path vector and the plurality of estimated flight-paths of the floating platform, a time and a location for launch or recovery of the floating platform that minimizes a likelihood of collision between the aircraft and the floating platform while the floating platform is in a flight;
deciding whether to terminate the flight of the floating platform; and
releasing the plurality of releasably-coupled component parts such that the plurality of releasably-coupled component parts are configured to descend under gravity separately or in groupings smaller than the payload in entirety.

19. The method of claim 18, further comprising determining a plurality of flight-paths of the floating platform comprises simulating a plurality of flight-paths for the floating platform based on:
a local atmospheric,
a project launch time,
a project launch location,
an operating parameter of the floating platform,
an ascent characteristic of the floating platform,
a propulsion characteristic of the floating platform,
a flight characteristic of the floating platform, and/or
a descent characteristic of the floating platform.

20. The method of claim 19, wherein the local atmospheric data is obtained from a floating platform launched previously.

21. The method of claim 19, wherein the local atmospheric data is obtained from a public database.

22. The method of claim 18, further comprising determining, by the processor, a possibility of intersection of a flight-path of the floating platform and a predetermined airspace.

23. The method of claim 18, further comprising dynamically determining, by the processor, while the floating platform is in flight, a likelihood of collision between the floating platform and the aircraft after the floating platform is launched.

24. The method of claim 23, further comprising dynamically determining, by the processor, while the floating platform is in flight, the operating parameters of the floating platform that minimize the likelihood of collision between the floating platform and the aircraft.

25. The method of claim 23, further comprising dynamically determining, by the processor, while the floating platform is in flight, the operating parameters of the floating platform that maintain at least a pre-determined separation from the aircraft.

26. The method of claim 22, further comprising, in response to a determination that the likelihood of collision is higher than a threshold, initiating a change in the flight-path of the floating platform.

27. The method of claim 26, wherein initiating the change in the flight-path of the floating platform comprises:

adjusting an ascent rate of the floating platform,
adjusting an altitude of the floating platform,
adjusting a lateral velocity of the floating platform,
adjusting propulsion of the floating platform,
adjusting a descent rate of the floating platform,
initiating a descent of the floating platform, and initiating a break-up of the floating platform.

* * * * *